US008221241B2

(12) United States Patent
Davis et al.

(10) Patent No.: US 8,221,241 B2
(45) Date of Patent: Jul. 17, 2012

(54) GAMING INVOLVING DEVICES IN MULTIPLE LOCATIONS

(75) Inventors: Dwayne A. Davis, Reno, NV (US); Michael M. Oberberger, Reno, NV (US); David M. Palmer, Reno, NV (US)

(73) Assignee: IGT, Reno, NV (US)

( * ) Notice: Subject to any disclaimer, the term of this patent is extended or adjusted under 35 U.S.C. 154(b) by 489 days.

(21) Appl. No.: 12/353,134

(22) Filed: Jan. 13, 2009

(65) Prior Publication Data

US 2010/0178986 A1 Jul. 15, 2010

(51) Int. Cl.
*A63F 13/00* (2006.01)

(52) U.S. Cl. ................ 463/42; 463/25; 463/27; 463/28; 463/29; 463/30

(58) Field of Classification Search ............. 463/16–25, 463/42
See application file for complete search history.

(56) References Cited

U.S. PATENT DOCUMENTS

| | | | | |
|---|---|---|---|---|
| 5,605,506 | A | 2/1997 | Hoorn et al. | |
| 6,488,585 | B1 * | 12/2002 | Wells et al. | 463/43 |
| 6,575,834 | B1 * | 6/2003 | Lindo | 463/40 |
| 6,863,608 | B1 | 3/2005 | LeMay et al. | |
| 6,908,387 | B2 | 6/2005 | Hedrick et al. | |
| 7,266,585 | B2 * | 9/2007 | Kay et al. | 709/206 |
| 7,490,238 | B2 * | 2/2009 | Roskind | 713/170 |
| 7,798,901 | B2 * | 9/2010 | Nguyen et al. | 463/29 |
| 7,938,727 | B1 * | 5/2011 | Konkle | 463/42 |
| 2002/0039923 | A1 * | 4/2002 | Cannon et al. | 463/42 |
| 2002/0065097 | A1 * | 5/2002 | Brockenbrough et al. | 455/552 |
| 2002/0086732 | A1 * | 7/2002 | Kirmse et al. | 463/42 |
| 2003/0177347 | A1 * | 9/2003 | Schneier et al. | 713/151 |

(Continued)

FOREIGN PATENT DOCUMENTS

WO 2005/010680 2/2005

(Continued)

OTHER PUBLICATIONS

International Search Report and Written Opinion dated Dec. 10, 2009, from Application No. PCT/US2009/056119.

*Primary Examiner* — N Drew Richards
*Assistant Examiner* — Ankush Singal
(74) *Attorney, Agent, or Firm* — Weaver Austin Villeneuve & Sampson LLP

(57) ABSTRACT

Techniques for managing games by a gaming entity (e.g., a casino) are disclosed. Various entities (e.g., persons, groups, organizations) can effectively be invited and participate in a game managed by a gaming entity. A gaming apparatus (e.g., a gaming server) can be operable to send one or more indications (e.g., invitations) to one or more devices associated with one or more entities to indicate that the one or more entities may be eligible to participate in a game managed by a gaming entity. It will be appreciated that devices may not be owned and/or operated by the gaming entity and may be operating outside of a domain where the gaming entity is located and/or operates. It will also be appreciated that mobile devices (e.g., cell phones, smartphones) can be operable to allow participation in games managed by a gaming entity. Mobile devices that are owned and operated by private parties can be used outside the primarily domain of a gaming entities, thereby allowing individuals who are not in a casino to participate in a game using their own devices without being physically present at the casino.

35 Claims, 13 Drawing Sheets

U.S. PATENT DOCUMENTS

| | | | | |
|---|---|---|---|---|
| 2004/0106448 | A1* | 6/2004 | Gauselmann | 463/25 |
| 2004/0185881 | A1* | 9/2004 | Lee et al. | 455/466 |
| 2004/0192439 | A1* | 9/2004 | Kula | 463/29 |
| 2004/0198403 | A1* | 10/2004 | Pedersen et al. | 455/517 |
| 2004/0210507 | A1* | 10/2004 | Asher et al. | 705/37 |
| 2005/0003888 | A1* | 1/2005 | Asher et al. | 463/25 |
| 2005/0026697 | A1* | 2/2005 | Balahura et al. | 463/42 |
| 2005/0159212 | A1* | 7/2005 | Romney et al. | 463/25 |
| 2005/0181870 | A1* | 8/2005 | Nguyen et al. | 463/29 |
| 2006/0030959 | A1* | 2/2006 | Duhamel | 700/91 |
| 2006/0136326 | A1* | 6/2006 | Heckman et al. | 705/37 |
| 2006/0211493 | A1* | 9/2006 | Walker et al. | 463/29 |
| 2006/0240887 | A1* | 10/2006 | Walker et al. | 463/16 |
| 2006/0247011 | A1* | 11/2006 | Gagner | 463/20 |
| 2007/0026935 | A1* | 2/2007 | Wolf et al. | 463/25 |
| 2007/0054739 | A1* | 3/2007 | Amaitis et al. | 463/42 |
| 2007/0055728 | A1* | 3/2007 | Shea et al. | 709/204 |
| 2007/0087834 | A1* | 4/2007 | Moser et al. | 463/42 |
| 2007/0094721 | A1* | 4/2007 | Nguyen et al. | 726/9 |
| 2007/0117608 | A1* | 5/2007 | Roper et al. | 463/16 |
| 2007/0167210 | A1* | 7/2007 | Kelly et al. | 463/16 |
| 2007/0167216 | A1* | 7/2007 | Walker et al. | 463/18 |
| 2007/0167225 | A1* | 7/2007 | Nguyen et al. | 463/29 |
| 2007/0243925 | A1* | 10/2007 | LeMay et al. | 463/20 |
| 2007/0257430 | A1* | 11/2007 | Hardy et al. | 273/139 |
| 2007/0265094 | A1* | 11/2007 | Tone et al. | 463/42 |
| 2007/0270201 | A1* | 11/2007 | Olmstead et al. | 463/16 |
| 2008/0020814 | A1* | 1/2008 | Kernene | 463/10 |
| 2008/0026827 | A1* | 1/2008 | Skotarczak et al. | 463/25 |
| 2008/0058048 | A1* | 3/2008 | Lutnick et al. | 463/16 |
| 2008/0102956 | A1* | 5/2008 | Burman et al. | 463/42 |
| 2008/0132311 | A1* | 6/2008 | Walker | 463/16 |
| 2008/0139306 | A1* | 6/2008 | Lutnick et al. | 463/30 |
| 2008/0207315 | A1* | 8/2008 | Bloebaum et al. | 463/29 |
| 2008/0218312 | A1* | 9/2008 | Asher et al. | 340/10.1 |
| 2008/0254881 | A1* | 10/2008 | Lutnick et al. | 463/31 |
| 2008/0268931 | A1* | 10/2008 | Alderucci et al. | 463/11 |
| 2008/0268958 | A1* | 10/2008 | Walker et al. | 463/40 |
| 2009/0005146 | A9* | 1/2009 | Kelly et al. | 463/16 |
| 2009/0043881 | A1* | 2/2009 | Alstad | 709/224 |
| 2009/0061974 | A1* | 3/2009 | Lutnick et al. | 463/13 |
| 2009/0093290 | A1* | 4/2009 | Lutnick et al. | 463/16 |
| 2009/0104956 | A1* | 4/2009 | Kay et al. | 463/7 |
| 2009/0124350 | A1* | 5/2009 | Iddings et al. | 463/25 |
| 2009/0186700 | A1* | 7/2009 | Konkle | 463/42 |
| 2009/0239650 | A1* | 9/2009 | Alderucci et al. | 463/25 |
| 2009/0264190 | A1* | 10/2009 | Davis et al. | 463/26 |
| 2010/0029376 | A1* | 2/2010 | Hardy et al. | 463/25 |
| 2010/0036720 | A1* | 2/2010 | Jain et al. | 705/14.13 |
| 2010/0093420 | A1* | 4/2010 | Wright et al. | 463/17 |

FOREIGN PATENT DOCUMENTS

| | | |
|---|---|---|
| WO | 2007/136686 | 11/2007 |
| WO | 2010/082958 | 7/2010 |

* cited by examiner

GAMING INVOLVING DEVICES IN MULTIPLE LOCATIONS

BACKGROUND

Casinos and other forms of gaming comprise a growing multi-billion dollar industry both domestically and abroad, with electronic and microprocessor based gaming machines being more popular than ever. A gaming entity that provides gaming services may control gaming devices that are globally distributed in many different types of establishments. For example, gaming machines may be placed in casinos, convenience stores, racetracks, supermarkets, bars and boats. Further, via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known.

In a typical casino-based electronic gaming machine, such as a slot machine, video poker machine, video keno machine or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is enabled to operate in this manner because it is placed typically in a location that is monitored (e.g., a casino), the gaming machine hardware and software components are secured within a locked cabinet and the gaming machine includes a security system for detecting fraud or theft attempts.

More generally, a computing device (or computing system) can be used in a gaming environment. Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., smartphones) offer computing environments that are similar to that provided by a personal computer (PC). As such, a smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

SUMMARY OF THE INVENTION

Broadly speaking, the invention relates to gaming and gaming systems. The invention, among other things, provides techniques for managing games by a gaming entity (e.g., a casino). In accordance with one aspect of the invention, entities (e.g., persons, groups, organizations) can effectively be invited and participate in a game managed by a gaming entity. In one embodiment, a gaming apparatus (e.g., a gaming server) can be operable to send one or more indications (e.g., invitations) to one or more devices associated with one or more entities to indicate that the one or more entities may be eligible to participate in a game managed by a gaming entity. It will be appreciated that devices may not be owned and/or operated by the gaming entity and may be operating outside of a domain where the gaming entity is located and/or operates. The gaming apparatus can also be operable to determine whether to allow an entity to participate in the game. An indication of the willingness of the entity to participate in the game can be effectively sent by the device associated with the entity and received by the gaming apparatus before allowing the entity to participate in the game. The gaming apparatus can also be operable to send the device an indication of the outcome of the game.

It will also be appreciated that mobile devices (e.g., cell phones, smartphones) can be operable to allow participation in games managed by a gaming entity. Mobile devices can be used outside the primarily domain of a gaming entities, thereby allowing individuals who are not in a casino to participate in a game without being physically present at the casino. By way of example, a gaming server can effectively send invitations on behalf of a casino to mobile devices that are registered with a casino. The mobile devices can be owned and operated by the private entities and can operate outside the casino and/or outside the state where the casino is located. A mobile device can, for example, be used by a person to participate in a game which is offered by a casino as a bonus to registered individuals who may be matched and play a games against players in a casino. A person may, for example, be matched against a player in the casino to play a game (e.g., draw poker) in a tournament, thereby enhancing the gaming experience. It will be appreciated that mobile devices, for example cell phones or smartphones, can be configured to allow users to participate in a game using devices that are familiar in a convenient way.

Some implementations of the invention provide a gaming apparatus operable to send one or more first indications to one or more devices associated with one or more other entities. The first indication may, for example, be an indication that one or more of the entities may be eligible to participate in a game managed by the gaming entity. The gaming apparatus may be operable to receive a second indication from a first device associated with a first entity in response to the first indication. The second indication may indicate that the first entity is willing to participate in the game managed by the gaming entity. The gaming apparatus may be operable to determine whether to allow the first entity to participate in the game, to allow the first entity to participate in the game if the determining determines to allow the first entity to participate in the game and/or to send the first device a third indication indicative of an outcome of the game if the first entity is allowed to participate in the game.

In some such implementations, the gaming apparatus may be a gaming server operable to communicate with a plurality of devices that are not owned and/or operated by the gaming entity. The plurality of devices may include at least one mobile device. The gaming apparatus may be further configured to send a fourth indication regarding a game state prior to the outcome. The game may be provided as a bonus game. The gaming entity may be a casino that operates in at least one casino building. One or more of the other entities may not be inside the casino building(s).

Alternative implementation provide a device operable to do the following: receive as input a first indication from that indicates that an entity associated with the device may be eligible to participate in a game managed by a gaming entity; receive input indicative of the entity's willingness to participate in the game; send as output a second indication indicative of the entity's willingness to participate in the game if the input indicative of the entity's willingness to participate in the game is received; allow the entity to participate in the game managed by the gaming entity; and receive a third indication indicative of an outcome of the game.

The device may be further operable to execute a client application program operable to communicate with a gaming server which allows the entity to participate in the game. The device may be further operable to communicate with a user agent that allows the entity to participate in the game. For example, the user agent may include a browser operable for browsing a web site of the gaming entity. The device may be further operable to send a fourth indication regarding a game state prior to the outcome.

Yet other implementations provide methods of managing a game by a gaming entity for participation by one more other entities. Some such methods may involve sending one or more first indications to one or more devices associated with the other entity or entities. The first indication may, e.g., indicate that one or more of the other entities may be eligible to participate in the game. The method may involve receiving a second indication from a device associated with a first entity in response to the first indication. The second indication may, e.g., indicate that the first entity is willing to participate in the game. The method may involve determining whether to allow the first entity to participate in the game and allowing the first entity to participate in the game if it is determined to allow the first entity to participate in the game.

The method may involve determining the outcome of the game and sending the first device a third indication indicating an outcome of the game. The method may further involve sending a fourth indication regarding a game state prior to the outcome. The method may further involve determining whether the first entity remains eligible to participate in the game.

The method may further involve authenticating the first entity and allowing the first entity to participate in the game if the first entity is successfully authenticated. The first indication may be sent to the first entity before receiving a request for participation in the game from the first entity. For example, the first indication may be a limited invitation for participation is the game.

In some instances, the first entity may not be owned and/or controlled by the gaming entity. For example, the first entity may be outside a gaming domain of the gaming entity. The method may also involve determining the physical location of the first device and/or determining a first set of rules and regulations to apply based on the physical location of the device.

The sending step may involve sending the first indication to a plurality of devices. The step of determining of whether to allow the first entity to participate in the game may comprise: determining whether the second indication has been received within a determined and/or predetermined amount of time; determining whether allowing the first entity to participate in the game would exceed a determined and/or predetermined total number of entities that are allowed to participate in the game; determining whether allowing the first entity to participate in the game would exceed a determined and/or predetermined number of devices in communication with the gaming entity; and/or determining whether allowing the first entity to participate in the game would exceed a determined and/or predetermined total number of entities outside a gaming domain of the gaming entity that are allowed to participate in the game.

The method may also include the step of allowing the first entity and a second entity to both participate in the game. In some cases, the first entity may be outside a gaming domain of the gaming entity and the second entity may be within the gaming domain. The method may also involve determining whether to apply a first set of rules and/or regulations for the first entity that is different from a set of rules and/or regulations applied to the second entity.

In other instances, the second entity may be a second person playing a wagering game in a casino, and the first entity may be a first person using the first device outside of the casino. The method may involve sending an invitation to the second person to participate in the wagering game. The method may involve allowing the first person to play against the second person. The method may involve inviting the second person to participate in playing a bonus game for the wagering game.

The invention can be implemented in numerous ways, including, for example, a method, an apparatus, as software or firmware stored in a computer readable medium, as a computing system (e.g., a computing device), etc. Accordingly, some manifestations of the invention provide a computer readable medium having executable computer program code stored thereon. The executable computer program code may be for managing a game by a gaming entity for participation by one more other entities.

Such executable computer program code may, for example, include instructions for controlling at least one device to do the following: sending one or more first indications to one or more devices associated with the one or more other entities, wherein the first indication indicates that the one or more other entities may be eligible to participate in the game managed by the gaming entity; receiving a second indication from at least a first device of the one or more devices in response to the first indication, wherein the first device is associated with a first entity of the one or more other entities, and wherein the second indication effectively indicates that the first entity is willing to participate in the game managed by the gaming entity; determining whether to allow the first entity to participate in the game after sending the first indication to the first device; allowing the first entity to participate in the game if the determining determines to allow the first entity to participate in the game; and sending the first device a third indication indicative of an outcome of the game if the first entity is allowed to participate in the game.

Several embodiments of the invention are discussed in more detail below. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

BRIEF DESCRIPTION OF THE INVENTION

The invention relates to gaming and gaming systems. The invention, among other things, provides techniques for managing games by a gaming entity (e.g., a casino). In accordance with one aspect of the invention, entities (e.g., persons, groups, organizations) can effectively be invited and participate in a game managed by a gaming entity. In one embodiment, a gaming apparatus (e.g., a gaming server) can be operable to send one or more indications (e.g., invitations) to one or more devices associated with one or more entities to indicate that the one or more entities may be eligible to participate in a game managed by a gaming entity. It will be appreciated that devices may not be owned and/or operated by the gaming entity and may be operating outside of a domain where the gaming entity is located and/or operates. The gaming apparatus can also be operable to determine whether to allow an entity to participate in the game. An indication of the willingness of the entity to participate in the game can be effectively sent by the device associated with the entity and received by the gaming apparatus before allowing the entity to participate in the game. The gaming apparatus can also be operable to send the device an indication of the outcome of the game.

It will also be appreciated that mobile devices (e.g., cell phones, smartphones, etc.) can be operable to allow participation in games managed by a gaming entity. Mobile devices can be used outside the primary domain of a gaming entity, thereby allowing individuals who are not in a casino to participate in a game without being physically present at the casino. By way of example, a gaming server can effectively send invitations on behalf of a casino to mobile devices that are registered with a casino. The mobile devices can be owned and operated by the private entities and can operate outside the casino and/or outside the state where the casino is located. A mobile device can, for example, be used by a person to participate in a game which is offered by a casino as a bonus to registered individuals who may be matched and play a games against players in a casino. A person may, for example, be matched against a player in the casino to play a game (e.g., draw poker) in a tournament, thereby enhancing the gaming experience. It will be appreciated that mobile devices, such as, for example, cell phones, smartphones which are widely used can be configured to allow users to participate in a game using devices that are familiar in a convenient way.

Embodiments of these aspects of the invention are discussed below with reference to FIGS. 1A-8. However, those skilled in the art will readily appreciate that the detailed description given herein with respect to these figures is for explanatory purposes as the invention extends beyond these limited embodiments.

Figure 1A:
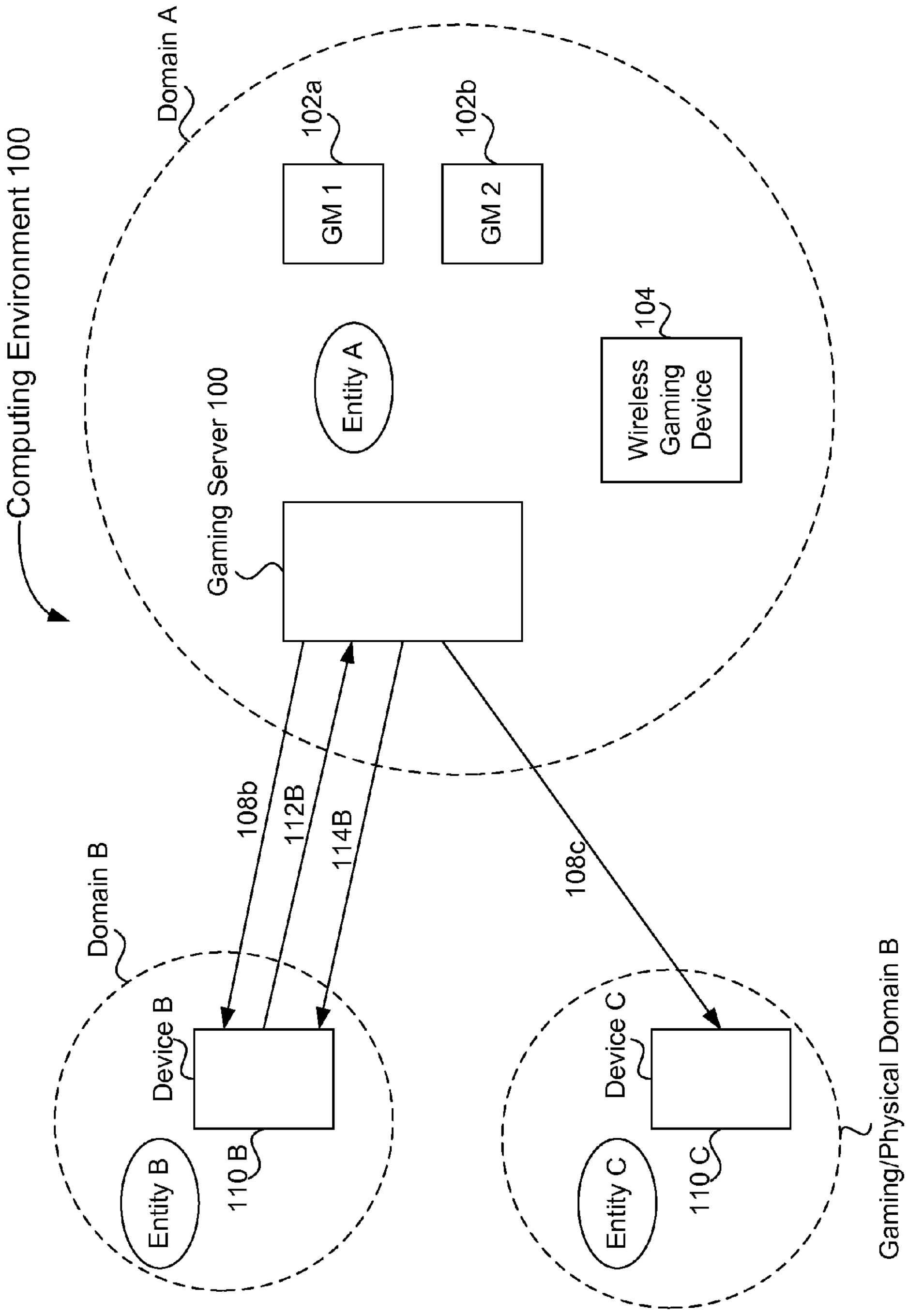
FIG. 1A depicts a gaming server 100 in accordance with one embodiment of the invention.

FIG. 1A depicts a gaming server 100 in accordance with one embodiment of the invention. Referring to FIG. 1A, the gaming server 100 is shown in a domain A. The Gaming server 100 can, for example, be owned and/or operated by a gaming entity (e.g., a casino) in the domain A. The gaming entity can, for example, manage various games including games of chance requiring at least an element of chance and/or wagering games requiring a bet or wagering amount, as is generally known. As shown in FIG. 1A, the gaming server 100 can, for example, effectively serve various gaming devices including the gaming machines 102 and one or more wireless gaming devices within a domain A. The domain A can, for example, correspond to a physical and/or geographical area (e.g., a physical building where a casino is located) and/or a jurisdiction (e.g., a state such as Nevada). Typically, a number of gaming devices including gaming machines 102 (GM1 and GM2) and one or more wireless gaming device are owned and/or by the gaming entity but can be made available to an entity A within the gaming domain A. By way of example, gaming machines 102 (GM1 and GM2) can be made available to the general public for wagering games in a casino and a wireless gaming device 104 may be authorized for use within the proximity of the casino. The gaming server 100 can communicate with the gaming machines 102 and one or more wireless gaming devices 104 to effectively manage games on behalf of a gaming entity.

It will be appreciated that the gaming server 100 can also be operable to communicate with devices outside the domain A in order to allow entities outside the domain A to use devices that are outside the domain A to participate in games managed on behalf of the gaming entity. More particularly, the gaming server 100 can be operable to send indications 108 to various devices that are not managed or own by the gaming entity. Referring to FIG. 1A, the gaming server 100 can send indications 108*b* and 108*c* respectively to devices 110B and 110C in domains B and C which are both outside the domain A and may not be owned or operated by the gaming entity. By way of example, device B can be a cell phone or a Personal Computer owned and operated by an individual. This individual may be outside the casino that manages the game or even residing in a different state or country from which the casino is located. Typically, devices 110B and 110C are owned and/or operated by other entities, namely entities B and C. Generally, devices 110B and 110C can be associated with entities other the gaming entity that owns or effectively operates the gaming server 100. The indication 108 can effectively indicate that the entities B and C may be eligible to participate in a game managed by the gaming entity. By way of example, the indication 108*b* sent by the gaming server 100 to the device B can effectively indicate that the entity B may be eligible to participate in a game managed by the gaming entity. By way of example, the game may be offered as a bonus to the entity B without requiring a wager. It will be appreciated that the device B (110B) can be operable to send an indication 112*b* to the gaming server 100 in response to the indication 108*b* received from the server 100. The indication 112*b* can effectively indicate that the entity B is willing to participate in the game managed by the gaming entity. As such, the indication 108*b* can, for example, be effectively issued by the gaming server 100 to the entity B as an invitation to participate in a game managed by the gaming entity, and the indication of 112*b* can be effectively issued by the device B (110B) as an acceptance of the invitation by the entity B.

In any case, the gaming server 100 can be operable to determine whether to allow an entity (e.g., entity B) to participate in a game managed by the gaming entity. Typically, the gaming server 100 receives the indication 112*b* (e.g., an acceptance) from the device B (110B) after it has sent the indication 108*b* (e.g., acceptance) to the device B (110B). After receiving the indication 112*b*, the gaming server 100 can be operable to determine whether to allow the entity B to participate in the game or not.

As will be described below, various criteria can be used by the gaming server 100 to determine whether to allow the first entity to participate in the game. By way of example, a limited number of spaces for participating in the game can be effectively filled on a first come, first serve basis, or invitations to participate can be offered for a limited amount of time so that if the indication 112*b* is not received within the allotted amount of time, entity B is not allowed to participate in the game.

If the gaming server 100 allows the entity B to participate in the game, it can provide an indication 114*b* of the outcome of the game to the device 110*b* to effectively indicate the outcome of the game. By way of example, the indication 114*b* can effectively let a person know that his or her participation has resulted in a winning outcome and a winning award (e.g., a monetary award, a gift, a voucher for good or services). Generally, the gaming server 100 can be operable to obtain an outcome of the game for the entity B. By way of example, the gaming server 100 can be operable to determine the outcome of the game or obtain it from one or more other gaming servers. As will be described below in greater detail, the gaming server 100 can effectively allow the entity B to participate in a game with one or more entities in different domains than the domain B. By way of example, the gaming server 100 can be operable to allow the entity B in domain B to participate in a game with an entity C in domain C and/or entity A in the Domain A.

Figure 1B:
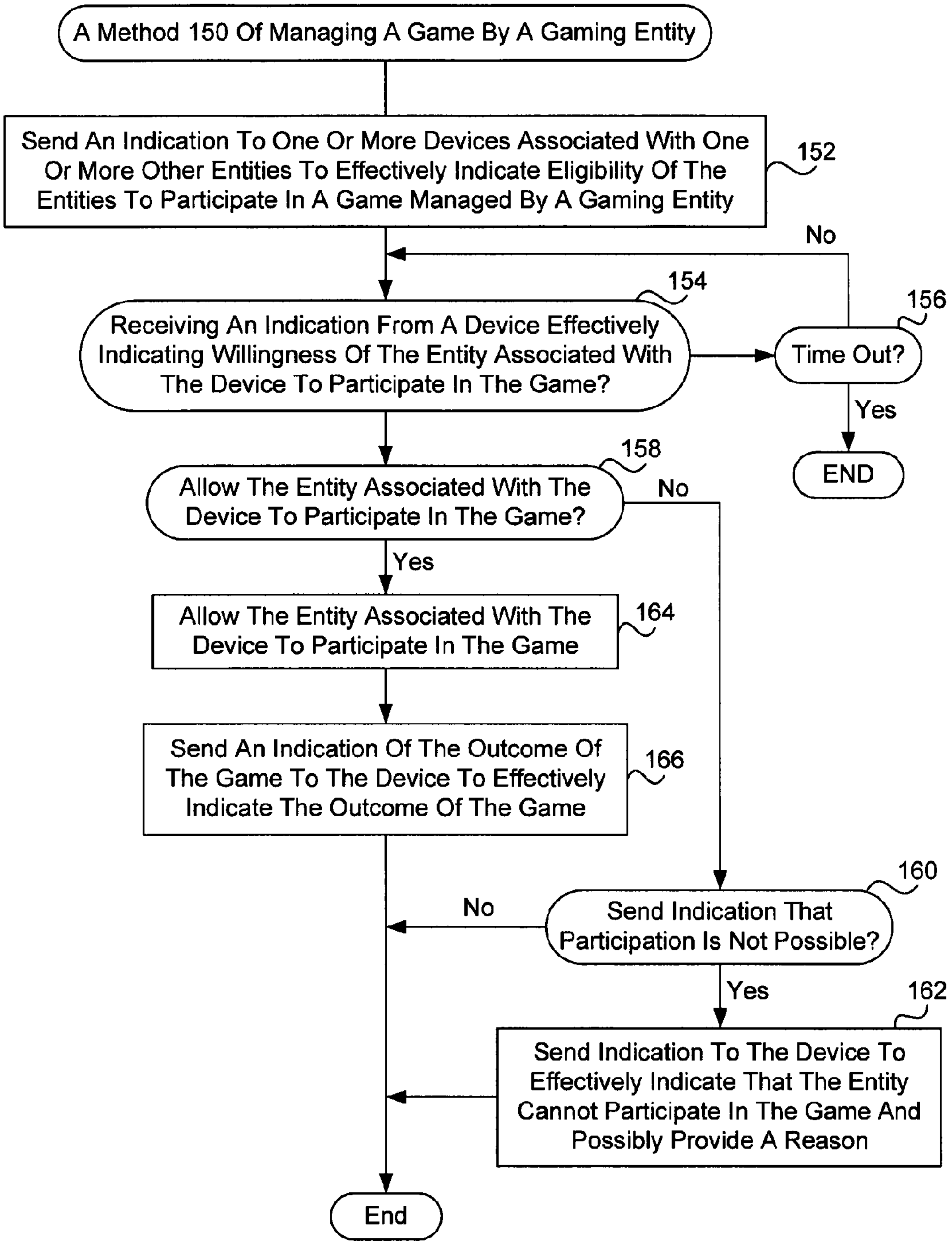
FIG. 1B depicts a method 150 for managing a game by a gaming entity in accordance with one embodiment of the invention.

FIG. 1B depicts a method 150 for managing a game by a gaming entity in accordance with one embodiment of the invention. Method 150 can, for example, be performed by the gaming server 100 depicted in FIG. 1A to effectively managing a game for a gaming entity (e.g., a casino). Referring to FIG. 1B, initially, a first indication is sent (152) to one or more device associated with one or more entities (i.e., one or more entities other than the gaming entity that effectively manages the game). The indication can effectively indicate that the one or more entities are eligible to participate in a game managed by the gaming entity. Next, it is determined (154) whether an indication has been received from a device. The indication can effectively indicate that the entity associated with the device is willing to participate in the game managed by the gaming entity. In effect, the method 150 can wait to receive an indication from a device, or end as a result of a timeout (156). If it is determined (154) that an indication indicating the willingness of an entity to participate in the game has been received from a device, it is determined (158) whether to allow the entity associated with the device to participate in the game managed by the gaming entity. If it is determined (158) not to allow the entity to participate in the game, it is determined (160) whether to send an indication to the associated device that participation is not possible. As such, an indication can be sent to the device to effectively indicate that the entity cannot participate in the game, and possibly provide a reason for not allowing the entity to participate in the game managed by the gaming entity (162). On the other hand, if it is determined (158) to allow the entity associated with the device to participate in the game, the entity is allowed to participate in the game (164) and an indication of the outcome of the game can be sent (166) to the device associated with the entity in order to effectively indicate the outcome of the game, thereby notifying the entity of the outcome of the game and possibly of a winning award or prize. The method 150 ends after sending an indication of the outcome of the game to the device.

Figure 2A:
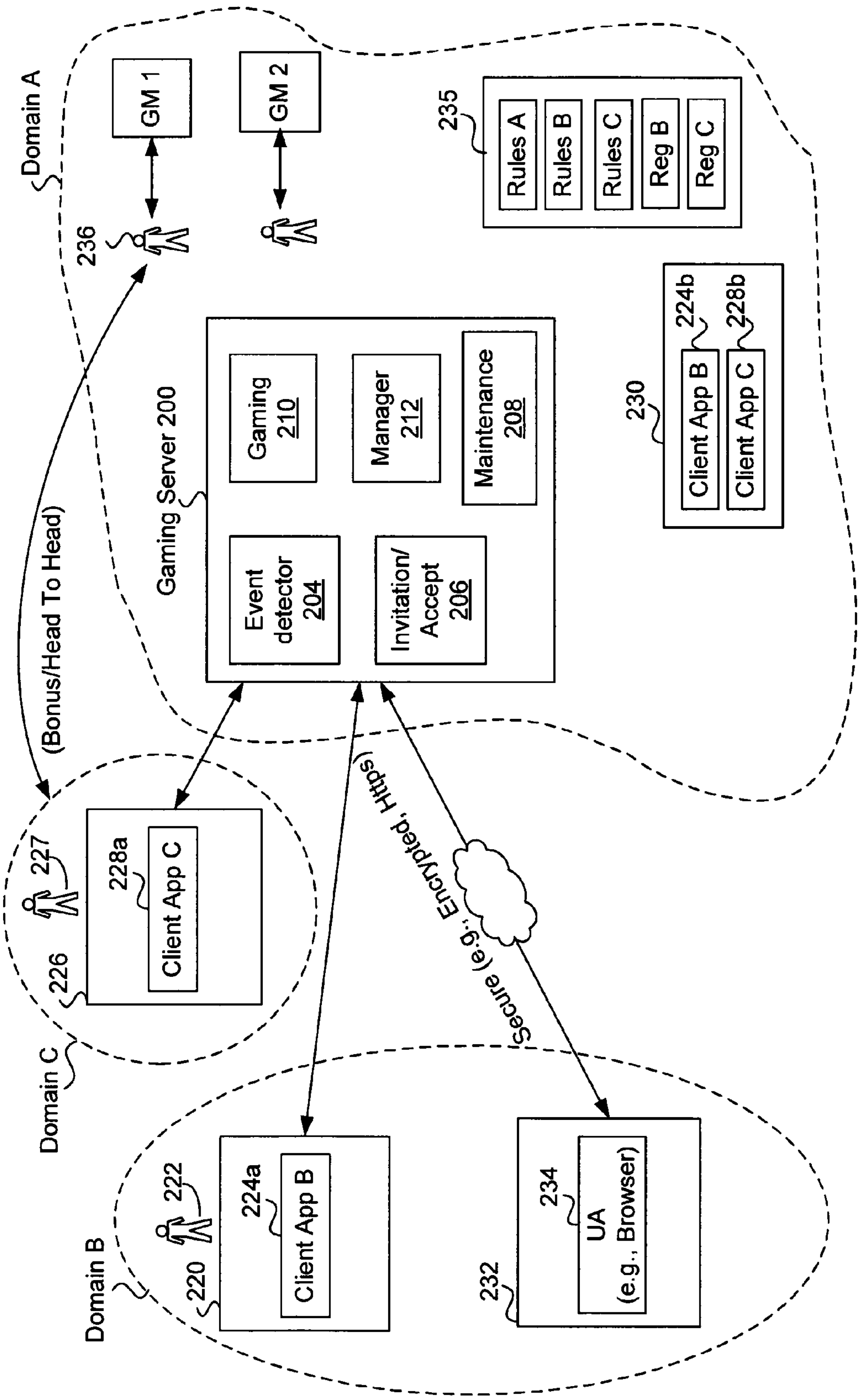
FIG. 2A depicts a gaming server 200 in greater detail in accordance with one embodiment of the invention.

FIG. 2A depicts a gaming server 200 in greater detail in accordance with one embodiment of the invention. Those skilled in the art will readily appreciate it that the gaming server 200 can include one or more processors and memory (not shown). Generally, the gaming server 200 can include hardware and/or software components (e.g., software modules). Referring to FIG. 2A, the gaming server 200 can include an event detector component 204, an invitation/acceptance component 206, a maintenance component 208, a gaming component 210, and a manager 212. The event detector component 204 can be operable to effectively detect an event causing the invitation/acceptance component 206 to send a number of invitations to devices that are outside domain A representing, for example, a geographical, physical and/or jurisdiction where the gaming server 200 and/or a gaming entity (e.g., a casino) is located and/or operates. An event detected by the event detector component 204 can, for example, be a relatively simple timing event (e.g., every 4 hours, everyday at 10 am). As another example, an event detected by the event detector component 204 can be based on various gaming criteria (e.g., a bonusing condition such as a winning condition or a max bet on a gaming machine (e.g., on GM1)). Generally, the event detector component 204 can be operable to detect a triggering event based on one or more criteria, as will be appreciated by those skilled in the art. Similarly, the invitation/acceptance component 206 can be operable to effectively determine, based on one or more criteria, one or more devices associated with one or more entities (e.g., persons) to be invited to participate in a game managed by a gaming entity that owns and/or effectively operates the gaming server 200. By way of example, one or more registered entities (e.g., persons) can be selected from a registration database. The number of entities to be invited can, for example, be determined based on a desired and/or available number of spaces to be filled for a particular game and/or a particular triggering event. By way of example, it may desirable that every four (4) hours, two (2) people participate in a game provided as a bonus to people outside of a casino. In such as case, more than two (2) invitations could be sent to increase the likelihood of filling all of the desired spaces. As such, the invitation/acceptance component 206 can, for example, send six (6) invitations to six (6) different devices associated with six (6) different persons who may have been registered with a gaming entity to receive invitations.

Referring back to FIG. 2A, a device 220 can be operable to receive an invitation to participate in a game managed by the gaming entity. The device 220 can also be operable to effectively notify a person 222 of the invitation. The person 222 can effectively indicate his or her willingness to participate in the game managed by the gaming entity. In other words, the device 220 can be operable to receive from the person 222 as input the acceptance of the invitation to participate in the game managed by the gaming entity. The device 220 can be operable to send an indication to the gaming server 200 to effectively indicate that the person 222 has accepted the invitation and is willing to participate in the game managed by the gaming entity.

Generally, the gaming server 200 can be operable to determine whether to allow a person (e.g., person 222) to participate in a game. As such, the manager 212 can, for example, be operable to effectively make decisions regarding whether to allow the person 222 to participate in the game managed by the gaming entity. The decision of whether to allow a person 222 to participate can be made after the indication of effective willingness to participate (or an acceptance of the invitation) is received by the gaming server 200.

It should be noted that the device 220 can be operable to effectively use a client application 224*a* to communicate with the gaming server 200 and participate in a game managed by a gaming entity, as will be known to those skilled in the art. Similarly, a device 226 can effectively use a client application 228*a* to participate in a game managed by a gaming entity. However, client applications 224*a* and 228*a* can be different application programs provided for a different set of hardware and/or software requirements. By way of example, a platform independent application programming language (e.g., Java programming language) can be used to provide computer code for a generic application code. The generic code may then be executed on different platforms or used to develop code for execution on a particular platform.

Referring back to FIG. 2A, various client applications including client applications 224*b* and 228*b* can be stored in an applications database 230. The maintenance component 208 can be operable to effectively provide and/or update client applications to various devices as needed. The devices may be registered with the gaming entity. It should be noted that a device may not need a client application. By way of example, a device 232 can, for example, be operable to effectively use a User Agent (UA) 234 to participate in a game managed by a gaming entity. The User Agent (UA) 234 can, for example, include a browser using Flash technology to allow the person 222 to login to a webpage effectively provided by a casino, as will be known to those skilled in the art. Communication between the gaming server 200 and device 232 can be secured. By way of example, data can be encrypted and/or a secure communication mechanism (e.g., Hypertext Transfer Protocol over Secure Socket Layer (or HTTPS)) can be used, as will be appreciated by those skilled in the art.

Referring back to FIG. 2A, the gaming component 210 can be operable to conduct operations that are more closely related to the game managed by the gaming entity. These alternations can include execution of computer code for the game. As such, the gaming component 210 can, for example, be operable to determine the outcome of a game and any winning awards for the person 222. The outcome of the game and/or winning award for the person 222 can be communicated to the device 220.

It should be noted that a different set of rules and/or regulations may be applicable to a domain outside of the domain A where the gaming entity and/or the gaming server 200 operates. For example, a set of rules and/or regulations B may be applicable to the domain B, a different set of rules and/or regulations C may be applicable to the domain C, and so on. As shown in FIG. 2A, various rules and regulations including rules and regulations A, B and C can be stored in a rules and regulations database 235 respectively for domains A, B and C and used appropriately.

It should be noted that the gaming server 200 can be operable to effectively allow persons in different domains to participate in the same game, possibly against each other. By way of example, the gaming server 200 can be operable to effectively allow the person 222 located in the domain B to play in a game against a person located in domain A, namely, a person 236 who can, for example, be actually present in a casino. The persons 222 and 236 can, for example, participate in a head to head match against each other playing a game of draw poker, where a winner advances to the level until a final winner is determined.

Figure 2B:
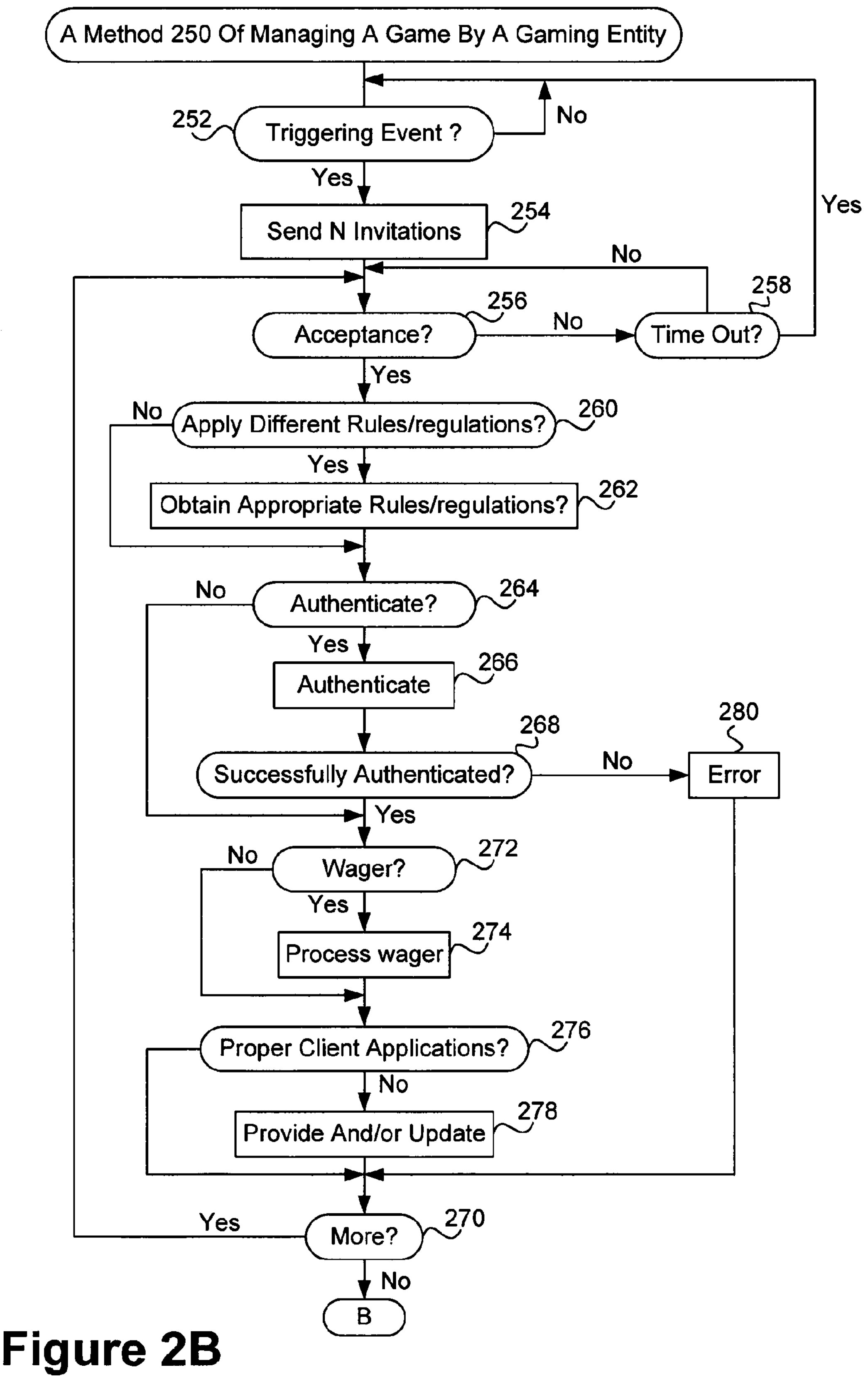
FIGS. 2B and 2C depict a few operations in accordance with one embodiment of the invention.
Figure 2C:
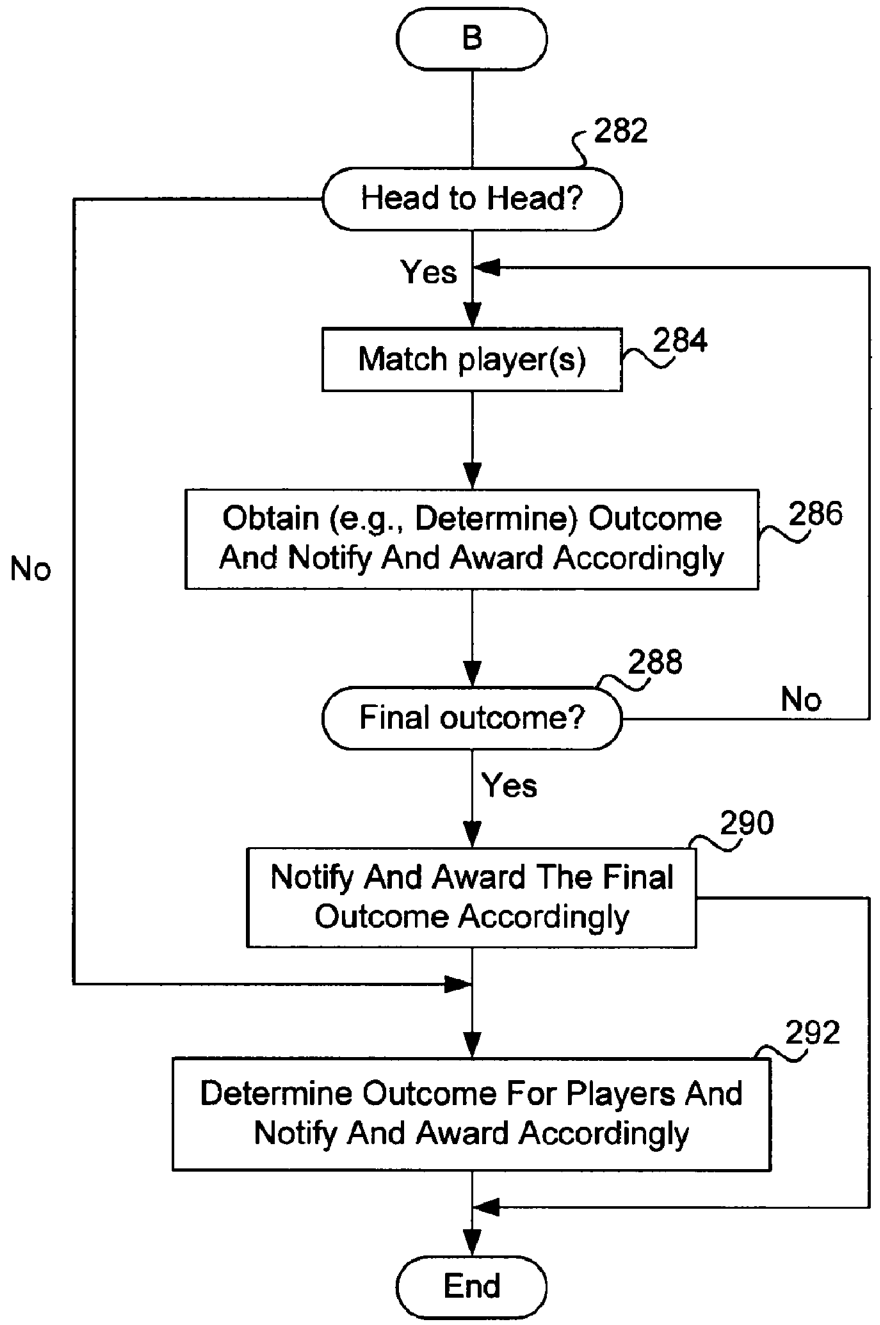

FIGS. 2B and 2C depict a method 250 for managing a game by a gaming entity in accordance with another embodiment of the invention. Method 250 can, for example, be performed by the gaming server 200 depicted in FIG. 2A. Referring to FIG. 2B, initially, it is determined (252) whether a triggering event (or condition) has occurred. In effect, the method 250 can wait for a triggering event to occur. As noted above, a triggering condition can, for example, be related to a gaming or a timing condition or event. In any case, if it is determined (252) that a triggering event has occurred, a number of invitations (N) are sent to various devices which may, for example, be registered to receive the invitations. Typically, a greater number of invitations (N) are sent than the actual number of desired and/or available places. After sending the invitations, it is determined (256) whether an invitation has been accepted. In effect, the method 250 can wait to receive an acceptance, or wait for a triggering event as a result of timeout (528). If it is determined (256) that an invitation has been accepted, it is determined (260) whether to apply a different set of rules/regulations than those that may be prevalent in the domain where a gaming entity and/or a gaming server is located and/or primarily operates. By way of example, it may be determined that the person who has accepted the invitation to participate in the game is in a jurisdiction which does not allow participation in a wagering game. As such, participation can effectively be offered as a bonus to the player and awards could be provided in a non-monitory form (e.g., prizes, coupons). Referring back to FIG. 2B, appropriate rules/regulations can be obtained (262). Generally, various operations can be performed in order to determine whether to allow a person to participate in a game managed by a gaming entity. To further elaborate, a few of exemplary operations are depicted in FIGS. 2B and 2C.

Referring now to FIG. 2B, it can be determined (264) whether to authenticate a person and/or device associated with the person who has effectively accepted an invitation to participate in the game. As such, a person and/or device can be authenticated (266). If it is determined (268) that the person and/or the device cannot be successfully authenticated (268), an error can be generated (280) and the method 250 can proceed to determined (270) whether to wait for another acceptance of the invitations sent. On the other hand, if it is determined that the person and/or the device has been successfully authenticated, it is determined (272) whether to receive a wager from the player. As such, a wager can be received and processed (274). Before allowing the person to participate in a wagering game of chance. In addition, it can be determined whether proper client applications are operating on the device which has effectively accepted the invitation. As such, if there is a need, one or more appropriate client applications can be provided and/or updated (278).

Next, it is determined (270) whether to wait for more invitations to be accepted and the method 250 can proceed in a similar manner as noted above to wait for an acceptance. By way of example, after an amount of time has passed or a determined number of acceptances have been processed, it can be determined (270) not to wait for an additional acceptance. Referring now to FIG. 2C, if it is determined (270) not to wait for additional invitations to be accepted, the method 250 can proceed to determine whether to allow the one or more persons who have accepted one or more invitations to participate in the game as a tournament or in a head-to-head style (282). As such, two or more players can be matched against each other (284) and one or more outcomes can be determined. Some games that can be provided according to the present invention may have multiple states, e.g., corresponding to a variety of intermediate game conditions. For example, a poker game may involve presenting an initial hand, a process of selecting some cards to keep and others to discard, a process of drawing additional cards, etc. Accordingly, there may be communication between the servers and the clients after the initial hand is presented but before the notification of a game outcome.

In addition, the participants can be notified of the outcome and any awards accordingly. The "final outcome" for an individual player may occur independently of the final outcome of a tournament: if the player is "knocked out" of the tournament the player may receive his or her winnings, if any, immediately, even though the tournament has not concluded. In a tournament style game, players can be matched against each other and winners can advance to the next level. As such, it can be determined (288) whether the final outcome has been determined and the method 250 can continue to match the winners against each other and advance the winners to another level until the final outcome has been determined. In some implementations, there may be some degree of delay between rounds of a tournament. For example, if a final round of a tournament will involve N players, the first player may qualify at a first time and the $N^{th}$ player may qualify at an $N^{th}$ time. Eventually, a winner can be determined. The winner will be notified of the final outcome and awarded (290). If it is determined (282) not to allow the one or more persons to participate in a game in a tournament and a head-to-head style manner, the outcome for each player can be determined and notification and awards can be provided to them accordingly before the method 250 ends. Those skilled in the art will readily appreciate that the exemplary determinations of the method 250 including the determination (282) of whether to process in a tournament or head to head style can represent a design choice, or made based on input received or various criteria including the preferences of registered players and/or the entity managing the games.

Figure 3B:
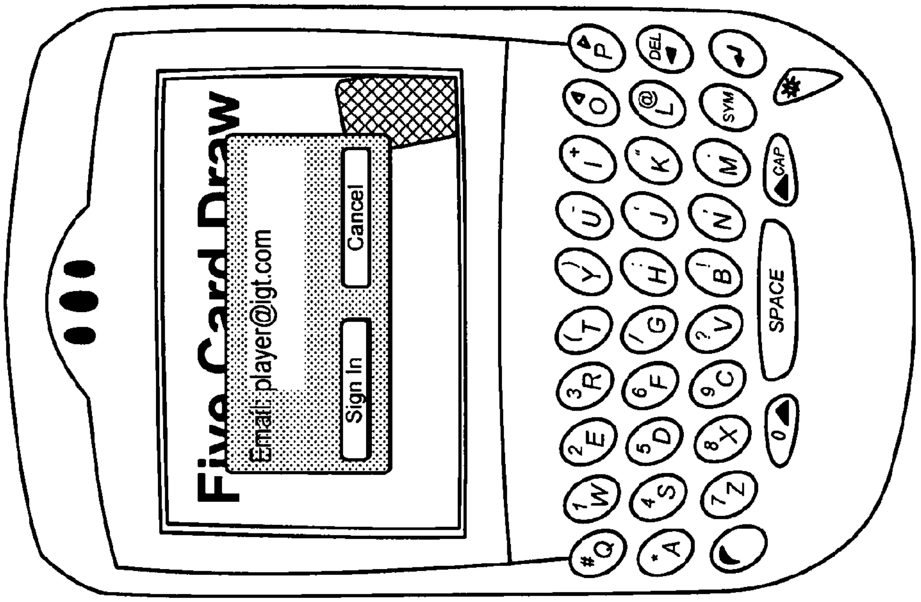
FIGS. 3A-3F depict a mobile device in accordance with one embodiment of the invention.
Figure 3A:
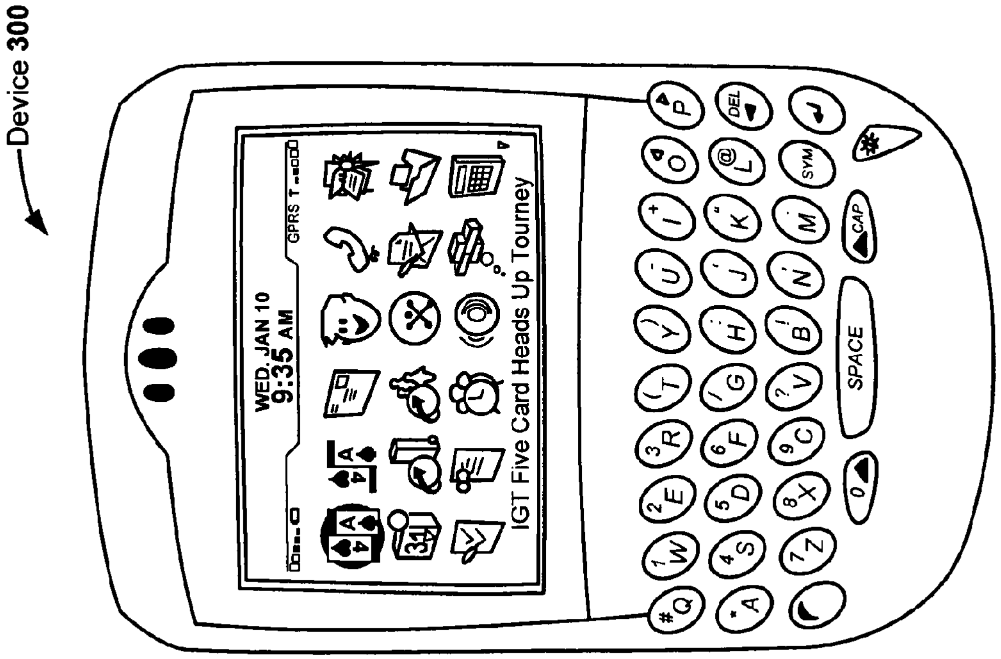

FIGS. 3A-3F depict a mobile device in accordance with one embodiment of the invention. Referring to FIG. 3A, a mobile device 300 is operable to allow a person to participate in a peer to peer bonus game, namely, a draw poker game which can be presented as a bonus game. The draw poker game can, for example, be played against a player playing a slot machine in a casino. The mobile device 300 can provide a Graphical user Interface (GUI) and input mechanisms such as, for example, a track wheel, a touch screen, a keyboard, etc.

Figure 3D:
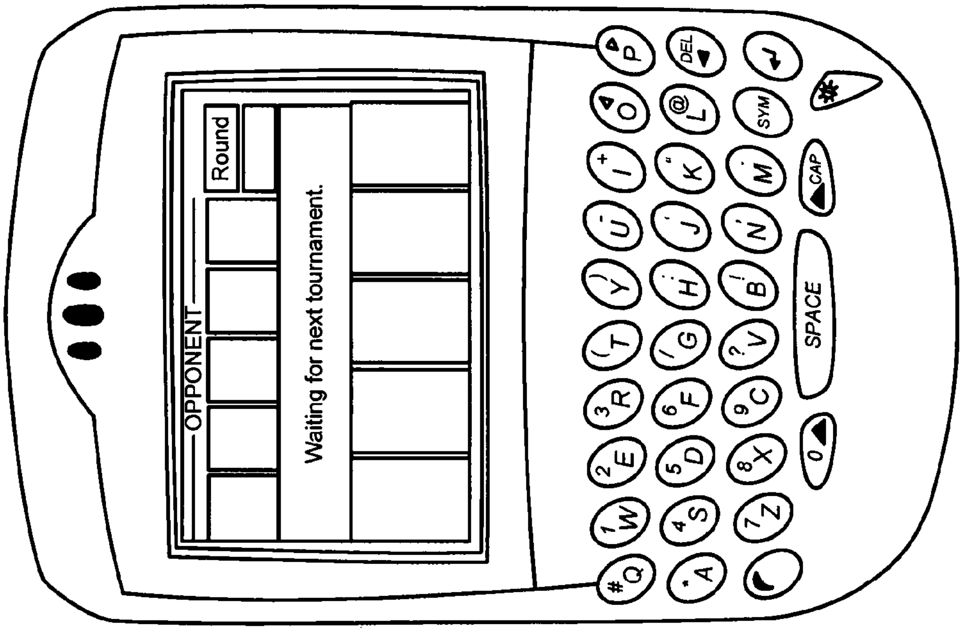
Figure 3C:
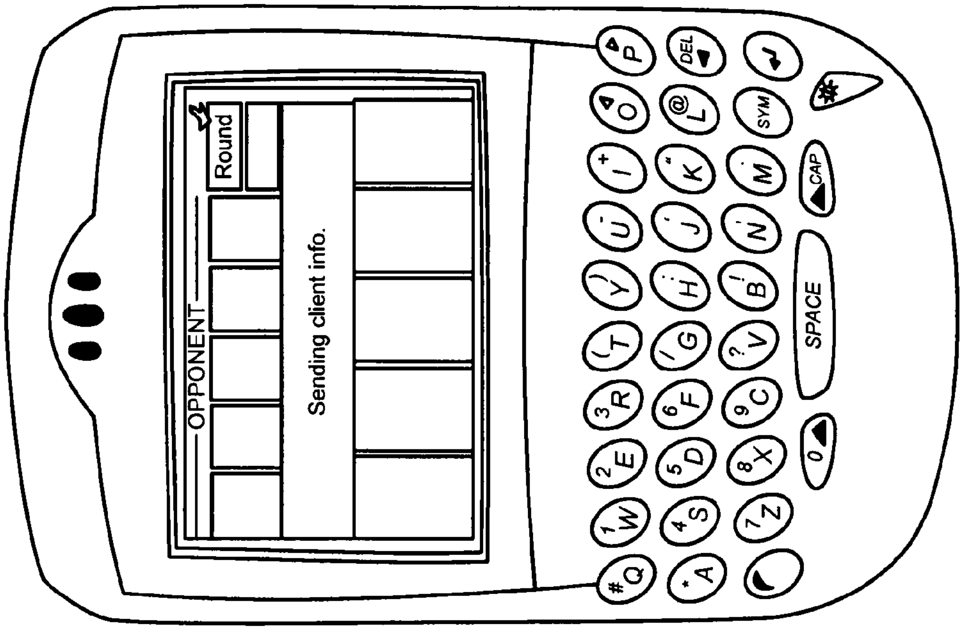
Figure 3F:
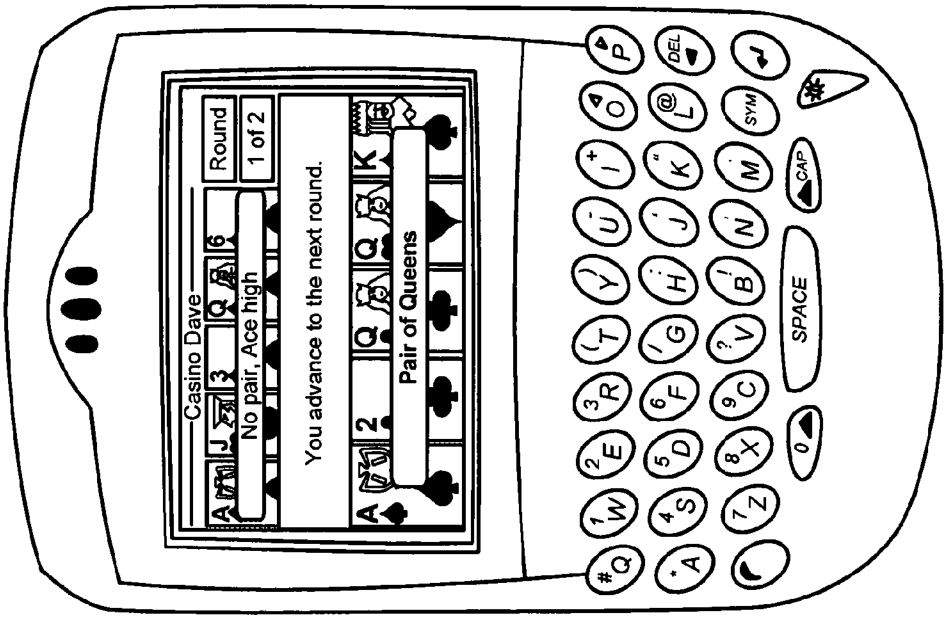
Figure 3E:
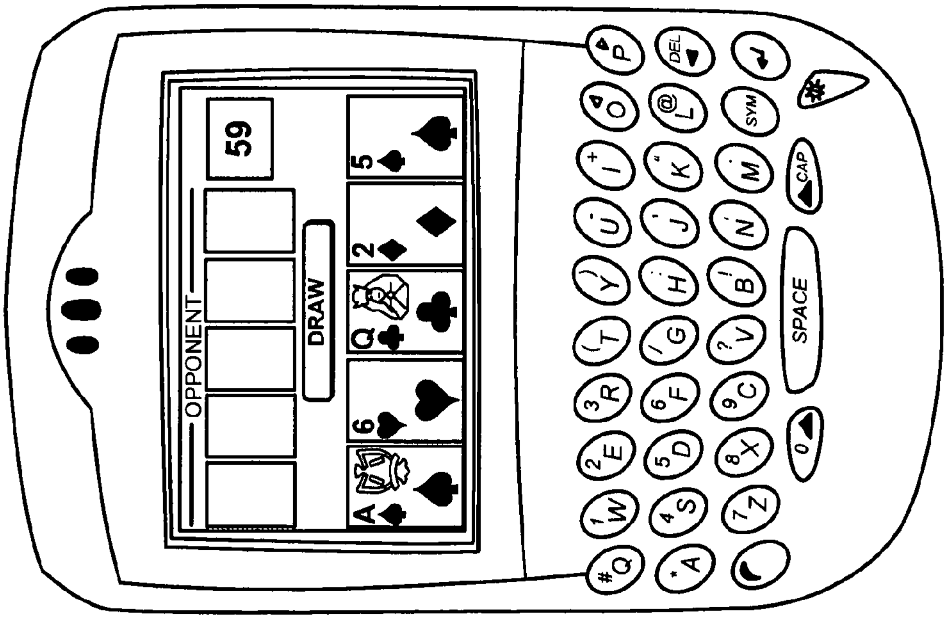

A client application program operating on the mobile device 300 can effectively allow a person to login in order to receive invitations to participate in various games that can be offered by a gaming entity (e.g., a casino). The login process can, for example, sign a person to a particular gaming server and/or sign the person for participation in a particular type of game. Referring to FIG. 3B, a login screen is depicted in accordance with one embodiment of the invention. However, it should be noted that it may not be necessary to require user to login. The device 300 can be in a ready state for receiving invitations and may communicate with a gaming sever that effectively manages games on behalf of a gaming entity. FIG. 3C depicts a communication screen where information may be communicated to a gaming server to, place the mobile device in a ready state for participation in one or more games managed by one or more gaming servers on behalf of one or more gaming entities. FIG. 3D depicts a ready state screen in accordance with one embodiment of the invention. Referring to the ready state depicted in FIG. 3D, the mobile device can be ready for the next available tournament. The person using the device 300 can, for example, be matched against a person playing a game in a casino. Both players can be alerted that they qualify to participate in a tournament. Referring to FIG. 3E, cards are displayed on the mobile device 300 to play a draw poker game, where cards can be held and a draw option can be selected to draw new cards. FIG. 3F depicts an advancement screen in accordance with one embodiment of the invention. Referring to FIG. 3F, the person using the mobile device has beaten a player playing in the casino and can advance to the next round.

Figure 4:
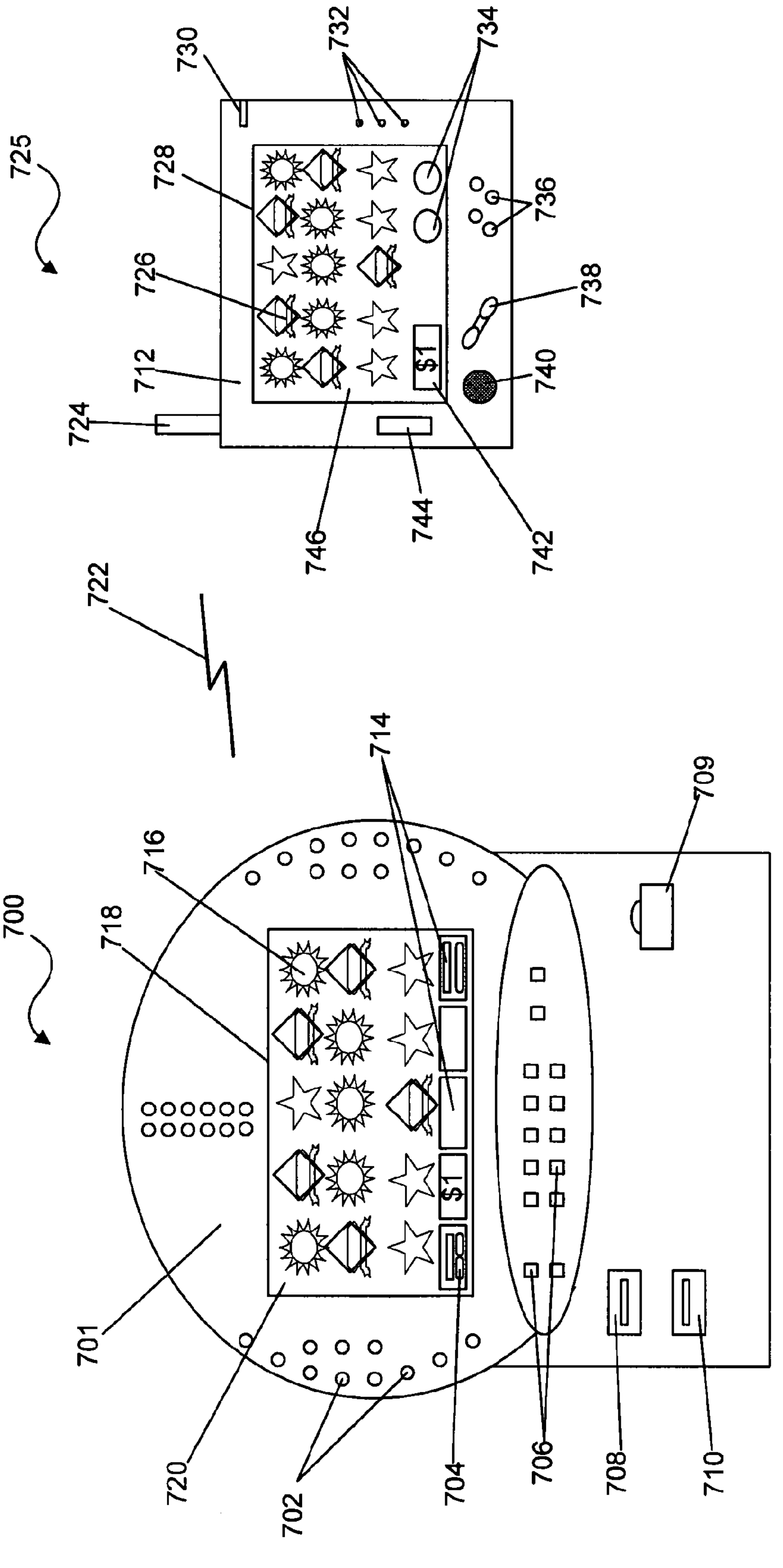
FIG. 4 is block diagram of a gaming machine in communication with a wireless game player.

It should be noted that a wireless gaming device can be used to participate in a game managed by a gaming entity in accordance with the invention. FIG. 4 is block diagram of a gaming machine 700 in communication with a wireless game player 725. The wireless game player 725 is used as a remote extension to extend the game playing capabilities of gaming machine 700. Game outcomes for games of chance generated using licensed and regulated gaming software executed on the gaming machine 700 may be presented on the wireless game player 725 at remote locations from the gaming machine 700. Thus, a game generated on a gaming machine 700 may be presented on a display 718 located on the main cabinet 701 of the gaming machine and played using input mechanisms located on the main cabinet of the gaming machine. In addition, the game generated on the gaming machine may be presented on a display 728 located on a wireless game player in communication with the gaming machine and played with input mechanisms located on the wireless game player.

As an example, a game 716 may be presented on a display 718 located on gaming machine 700. The game 716 may be played using input mechanisms, such as input buttons 706 or touch screen interface buttons 704. The touch screen interface buttons 704 are activated using a touch screen 720 located over the display 718 of the gaming machine 700. Further, a game 726 may be presented on display 728 located on the wireless game player 725. The game 726 may be played using input mechanisms located on the wireless game player 725, such as 738 and 736 or touch screen interface buttons 734. The touch screen interface buttons 734 are activated using the touch screen 746 located over the display 728.

The game logic for a game presented on display 718 or display 728 is stored within the main cabinet 701 of the gaming machine 700. The game logic, which is typically regulated gaming software, is executed by a master gaming controller located within the main cabinet 701 of the gaming machine 700. A particular game executed by the master gaming controller may be presented on display 718 or, when the wireless game player 725 is activated, on display 728. When the same game is presented on display 718 or on display 728, the graphical presentations of the game may vary between the displays because of hardware differences. For instance, display 718 may by larger than display 728 allowing for higher resolution graphical output on display 718 as compared to display 728.

While playing a game 726 on the portable wireless game player 725, a player may move throughout the areas of a casino where wireless game play is enabled. For instance, a player may be able to play the game 726 with the wireless game player 725 in a restaurant, a keno parlor or a sports book. The player's position does not have to remain static while playing the game 726 on the wireless game player 725 and the player may be actively moving while games are played on the wireless game player 725.

When a game is played on the wireless game player of the present invention, such as 725, all random number generation (RNG) events, game outcomes, meter information, game related information, and all cash transactions are generated and maintained in the licensed (controlled) gaming machine (e.g. 700), and not the wireless game device. Thus, the wireless game player 725 may be considered a remote extension of the gaming machine's 700 display and input mechanisms. With a gaming machine with a remote extension, the gaming machine may operate in both a local mode and a remote mode. In the local operational mode, game play is presented using the display and input mechanisms located on the gaming machine. In the remote operational model, game play is presented using the display and input mechanisms located on the wireless game player. These two operational modes are described as follows.

During local game play on a gaming machine, a player may input money or indicia of credit into the gaming machine, indicate a wager amount, and initiate a game play. For example, to play the slot game 716 on gaming machine 700, a player may deposit money or indicia of credit using the bill validator 708, the card reader 710 or the coin acceptor 709. Status information 714 for the game, such as a game denomination and available credits may be displayed on display 718. Next, using input buttons 706 and touch screen interface buttons 704, the player may make a wager and initiate the game. The gaming machine determines a game outcome and then presents the game outcome to player on the display 718. For instance, after a slot game has been initiated, the video gaming machine calculates the final position of the reels (e.g. the game outcome), the reels on display 718 spin and then stop at pre-determined position. Based on the pre-determined outcome calculated by the master gaming controller, an award may be presented to the player. As another example, after a card game has been initiated, the video gaming machine 700 calculates a sequence of cards to be dealt to the player and card hands are dealt on the display 718. During the card game play, the player may use input mechanisms on the gaming machine 700 to hold or discard cards. After the card game is complete, an award may be presented to the game player.

The games presented on the gaming machine 700 may be enhanced by additional features. Light patterns, such as from lights 702, and sounds may be generated on the gaming machine 700 to enhance the game outcome presentation. In addition, during certain game events, a bonus game may be presented to the game player.

During remote game play on a gaming machine using a wireless game player such as 725, a player may input money or indicia of credit into the gaming machine, activate a wireless game player, indicate a wager amount on the wireless game player and initiate a game play on the wireless game player. For example, to play the slot game 726 on gaming machine 700 using the wireless game player 725, a wireless game play session is requested by the player. A wireless game play session may include one or more game plays on a wireless game player 725 connected to the gaming machine 700 via a wireless communication link 722. The wireless game play session request by the player may be made using an input mechanisms located on the gaming machine.

Prior to beginning, the wireless game play session, a player may be required to deposit money or indicia of credit to in the gaming machine in communication with the wireless game player. The deposited credits may be used during the wireless game play session. For instance, using the bill validator 708, the card reader 710 or the coin acceptor 709 located on the gaming machine 700, the player may provide an initial amount of credits to be used for a wireless game play session using the wireless game player 725. During game play on the wireless game player, a player wagers a certain amount of credits per game. Depending on the outcome of a particular game, the number of credits available for game play may be decreased or may be increased.

After a game player has used all of their credits during a wireless game play session and the player desires to continue the wireless game play session, the player may be required to return to the gaming machine to add additional credits. In other embodiments (See FIG. 6), a card reader or other input device may be attached to the wireless game player 725 and used to add credits to the gaming machine 700. For instance, a player may be able to enter a credit card number or debit card number and transfer funds to the gaming machine to be used as game credits via a touch screen interface on the wireless game player 725. Further, the wireless game player may include a card reader for scanning a magnetic strip on the debit card or credit card.

After establishing game credits on the gaming machine, the wireless game player 725 is activated. In some embodiments, authentication and verification of the user of the wireless game player is performed. For example, to enforce age restrictions imposed by a jurisdiction, the user may be verified and authenticated to use the game player. The wireless game player may have a biometric sensor (not shown) such as a fingerprint sensor. As part of the authentication process, the player may be asked to place their finger on the sensor located on located on the wireless game player. The fingerprint image is sent back to the controller in the machine for comparison. As another example, the wireless game player may include a smart-card reader that reads biometric smart cards (cards having a built-in fingerprint sensor). The smart card has all the personal information of the casino guest. Thus, the authentication could occur directly at the wireless game player. A description of a finger print reader as an identification device is provided in U.S. Pat. No. 6,488,585, which is incorporated herein in its entirety and for all purposes. Other types of verification methods such as a PIN number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

For security, the wireless game player has an encrypted serial number (code), which is used to verify and authenticate the wireless game player. For additional security, an electronic key may be used with the device. With an electronic key system, the wireless game player device cannot be activated until the key is inserted into a receptacle on the game player. In addition, the wireless game player may have a small GPS (Global Positioning System) device to verify location of the device. Position verification may be used to insure the wireless game player is used only in legal gaming areas of the casino and to track lost or stolen devices. When the gaming machine detects that the wireless game player is in a restricted area, it may discontinue communications with the wireless game player. Further, the wireless game player may have an RF capacitive device built into the wireless game player. RF capacitive devices are often used in retail stores to prevent theft. When the wireless game player is passed through a protected doorway, an alarm may be sounded even when the power is off to the wireless game player. Other security features may be used on the wireless game player and are not limited to electronic keys, GPS sensors or RF capacitive devices described above. Verification and authentication may be required to start every wireless game play session. Further, there may be a non-play time limit. Once this time is exceeded, a verification and authentication cycle or process must be performed. The verification and authentication cycle may be performed for the player and the wireless game player, for only the player or for only the wireless game player. As another example, authentication and verification may be required after a certain number of games played on the gaming device or may be even be required at random intervals. When verification and authentication requirements are not satisfied during a wireless game play session, the game play session will typically be terminated.

In one embodiment, after the wireless game player is activated 725, the input mechanisms, such as the touch screen 720 and the input buttons 706, built into the gaming machine 700 are deactivated and a wireless game play session may begin. The display 718 on the gaming machine 701 may display an “out of order” message, an “operator” message or the display 718 may be blank to indicate the gaming machine is unavailable for game play. During remote game play on the wireless game player 725, gaming information necessary to present the game on the wireless game player, such as a graphical presentation of game outcome and meter information, is generated on the gaming machine 700 are transmitted to the wireless game player via wireless communication 722. The mathematical methods used to generate the game outcomes remain on the gaming machine 700. Further, gaming information required by the gaming machine 700 to the determine the game outcome, such as signals from input mechanisms located on the wireless game player, are transmitted from the wireless game player 725 to the gaming machine 700 via wireless communication 722.

During game play on the wireless game player 725, status information 742 for the game 726, such as a game denomination and available credits may be displayed on display 728. The status information 742 and the game 726 displayed on the wireless game player 725 may appear similar to what is displayed on the gaming machine 701 but is not necessarily identical to what is displayed on the gaming machine 700. Next, using input buttons, such 734, 736 and 738, the player may make a wager and initiate the game. In one embodiment of the present invention, the touch screen interface buttons 734 may be based on a web-browser interface.

After a game has been initiated on the wireless game player 725, via antenna 724, a wireless communication 722 containing the wager and initiate game inputs is sent to the gaming machine 700. In response, to the wager and the initialization of a game, the gaming machine 700 generates a game outcome including an award and possibly a bonus game. Instructions for displaying the game outcome and bonus game are sent in one or more wireless communications 722 to the wireless game player 725. The one or more wireless communications may be a series of information packets. The format of the information packets will vary according to the wireless communication standard used. Details of a wireless network for providing wireless communications is described with respect to FIG. 7. To illustrate the play of a particular game, a slot game and a card game are described. However, the present invention is not limited to these games as nearly any type of game that can be played on a video gaming machine may also be played on the wireless game player 725. When a slot game 726 has been initiated on the wireless game player 725, the gaming machine 700 calculates the final position of the reels (e.g., the game outcome). The gaming machine may send instruction to the wireless game player to spin the reels on display 728 spin and then stop the reels at a pre-determined position. Based on the final position of the reels calculated by the master gaming controller located on gaming machine 700, an award may be presented to the player. In addition, during certain game events, a bonus game may be presented to the game player as part of the slot game. As another example, after a card game has been initiated on the wireless game player 725, the video gaming machine 700 calculates a sequence of cards to be dealt. The gaming machine 700 sends wireless communications 722 to the wireless game player 725 indicating card hands to be dealt on the display 728. During the card game play, the player may use input mechanisms on the wireless game player 725 to hold or discard cards. After the card game is complete, an award may be presented to the game player. A bonus game may also be incorporated into the card game.

When a customer does not wish to use the wireless game player 725 anymore, the customer can terminate the wireless game play session using the touch screen 746 and deactivate the wireless game player 725. As described above, the wireless game player 725 may automatically terminate a wireless game play session and deactivate itself after a period of inactivity. After roaming with the wireless game player 725, the customer may return to the gaming machine providing the wireless game play session and wish to resume play on the main display of the gaming machine. In this case, the customer may depress a “return” button on the wireless game player 725 and after a verification cycle the player can begin playing at the gaming machine again.

The games presented on the wireless game player 725 may be enhanced by additional features. For instance, light patterns and sounds from the audio output 740 may be generated to enhance the game outcome presentation and add excitement to the games played on the wireless game player 725.

Further, the wireless game player may include an audio output interface for connecting headphones. As part of a game outcome presentation, sounds may be transmitted through the audio output interface to headphones worn by the game player.

Details of the wireless game player hardware are now described. The wireless game player 725 is generally a hand-held device. It consists of a housing 712, display 728, touch screen 746, switch panel 744, battery, wireless communication interface, and controller. In one embodiment of the present invention, a modified DT Research WebDT pad (DT Research, Inc., Milpitas, Calif.) is used as a wireless game player. However, the present invention is not limited to the DT research WebDT pad as other hand-held wireless devices such as personal digital assistants (PDA) may also be used.

In one embodiment, the wireless game player may be approximately 10.5×9.5×1.0 inches in size, weigh 3 pounds and use a 10.4 inch color LCD touch screen display. Typically, an 8 inch to 10.4 inch display provides a sufficient viewing area without reducing the size of the character fonts to a point where they are unreadable by most players. The touch screen (sensor) 746 is overlaid on the displayable surface of the LCD 728. Other display technologies can be used instead of LCD, plus some display technologies will incorporate a built-in touch screen (internal vs. external). To activate the touch screen 746, a stylus 730 may be used, but most people will use their fingers.

Audio is available via the small built-in speaker 740 or an external headset. Lighting schemes, such as arrays of LEDs, may be added to the wireless game player 725 to provide visual effects and to communicate status information to a game player. Status information, such as a battery level and connection status, may be provided by the status lights 732. The layout and number of the input buttons, including 738 and 736, is variable. In FIG. 4, the configuration of the input buttons on the gaming machine 700 and wireless game player are different. In one embodiment of the present invention, the input buttons on the wireless game player 725 may be configured in a manner similar to input buttons located on the gaming machine. Further, other devices on the wireless game player, such as the audio output 740, the status lights 732, the antenna 724 and the on/off switch 744 may be located at other locations on the housing 712 depending on the design of the wireless game player.

In one embodiment, the battery will last 5 hours between charging. Charging of the wireless game player may be accomplished by setting the wireless game player in a special storage cradle. The cradles may be in the form of storage bins located in a special area, located at the gaming machine or built as holders located on a desk, counter or table. For instance, a storage cradle for charging the wireless game player may be located in a keno parlor, restaurant tables or sports book. When the wireless game player is placed in a storage cradle it may used while being charged.

The wireless game player 725 can, for example, use an IEEE 802.11b compliant wireless interface. It is a 2.4 Ghz Direct Sequence Spread Spectrum radio system. It has a range of up to 330 ft (inside) from any access point. The data rate is 11 Mbps. IEEE 802.11b is a commonly used radio standard. Other exemplary wireless standards that may be used include IEEE 802.11a, IEEE 802.11x, hyperlan/2, Bluetooth, IrDA, and HomeRF.

In the example above, local gaming and remote gaming on gaming machine 700 has been described in a mutually exclusive manner. Therefore, when local gaming is enabled, remote gaming is disabled and when remote gaming is enabled, local gaming is disabled. However, the present invention is not so limited. Gaming machines that support only remote gaming and not local gaming may be used with the present invention. These gaming machines (see FIG. 8) may be located away from the casino floor. Further, a gaming machine may support simultaneously a plurality of remote gaming devices for game play and not just a single remote gaming device. Finally, gaming machine may be used that simultaneously provide both remote game play and local game play. For instance, one game player may use a gaming machine for local play while another game player is using a wireless game player connected to the gaming machine to play remotely.

Figure 5:
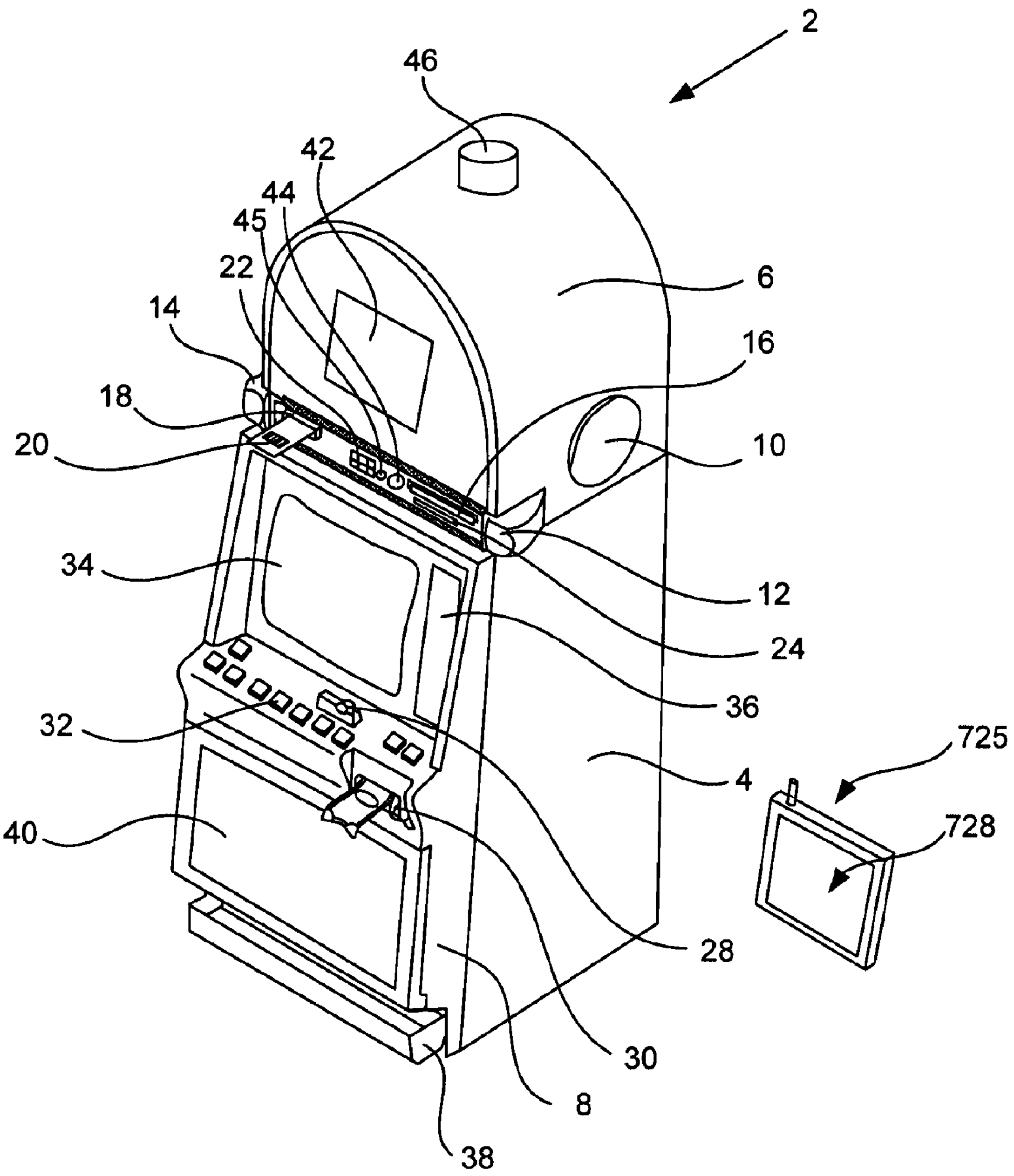
FIG. 5 depicts another video gaming machine suitable for use with the present invention.

In FIG. 5, another video gaming machine 2 suitable for use with the present invention is shown. Referring to FIG. 5, more details of a gaming machine as well as additional gaming services that may be provided with a gaming machine providing remote game play sessions are described. For instance, player tracking services may be provided on gaming machines of the present invention and player tracking points may be accumulated during a wireless game play session. Further, using a player tracking device located on a gaming machine, a player may be able to request a wireless game player for use in a wireless game play session.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor. In addition, the gaming machine 2 is designed to communicate to the wireless game player 725 with display 728. The wireless game player 725 effectively provides a remote extension to gaming machine 2.

Figure 6:
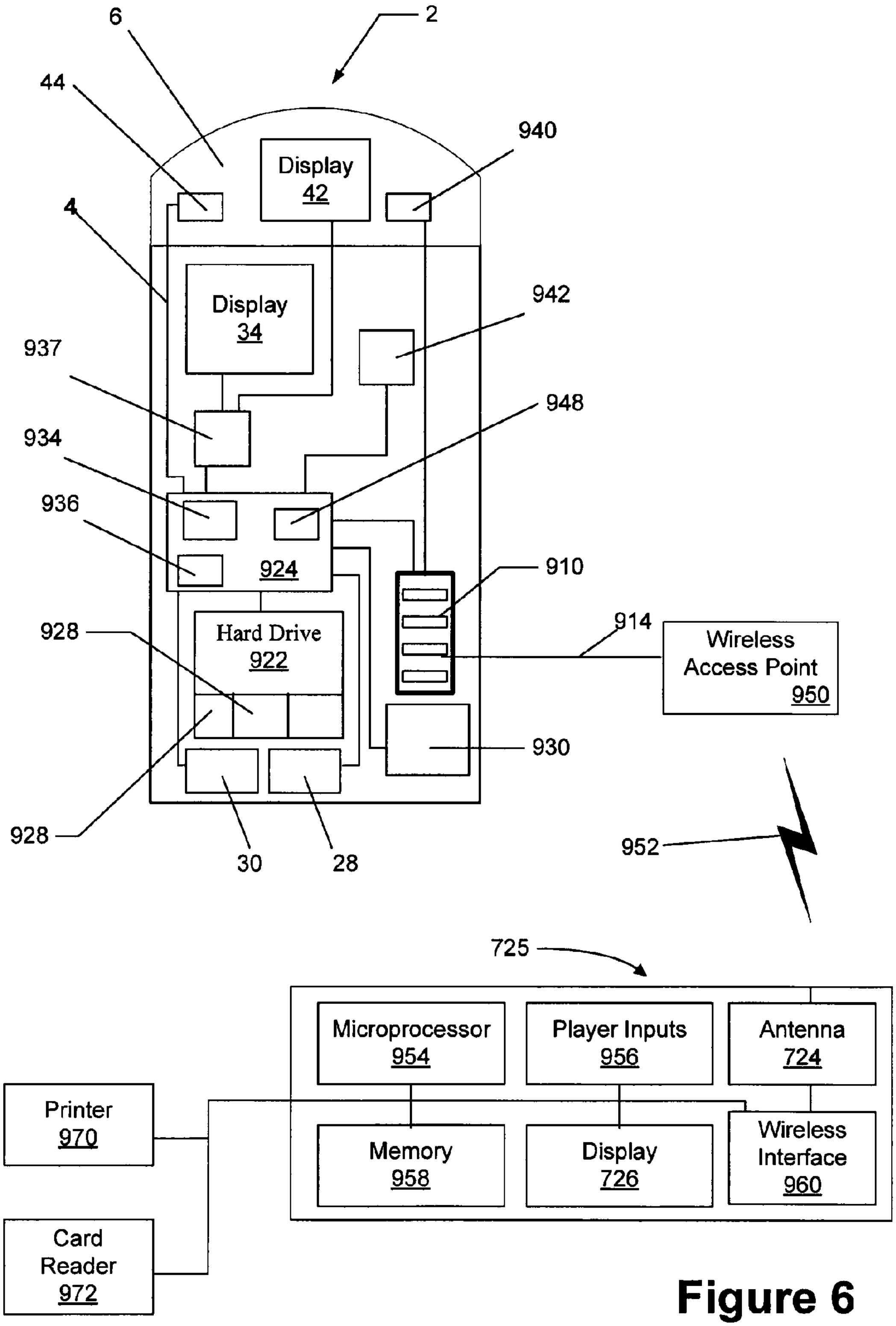
FIG. 6 is a block diagram of the internal components of a gaming machine and a wireless game player.

Typically, after a player has initiated a game on the gaming machine, one purpose of the main display monitor 34, the second display monitor 42 or the remote display 728 is the visual display of a game outcome presentation, including bonus games, controlled by a master gaming controller 924 (FIG. 6). Also, the main display monitor 34, the second display monitor 42 and the remote display 728 may also be utilized to display entertainment content independent of the game outcome presentation. For example, broadcast events, including television programming, may be provided to the main display monitor 34, the secondary display monitor 42 or the remote display 728. The broadcasts events may be sent to the gaming machine 2 via a cable link or other suitable link from outside of the gaming machine. All or some subset of the programming provided by a television broadcaster may be displayed as entertainment content on one or more of the video displays.

Television programming content of particular interest to casino operators and game players may include, for example, sporting events, talk shows, game shows, soap operas, advertisements, situation comedies, etc. In addition, broadcasts of competitive events on which the player can wager may be displayed. For example, dog racing or horse racing events may be displayed as content on the remote display 728. In such events, typically, there is a rather long down time between races. During this period, the player may play the wireless game player 725 connected to the gaming machine. Also, the television programming entertainment content may be displayed while a player is engaged in playing a game on the wireless game player 725 or between games. Similarly, the entertainment content may include information available on the Internet, including the World Wide Web, for more technologically sophisticated players.

Returning to the gaming machine in FIG. 5, the information panel 36 may be a back-lit, silk screened glass panel with lettering to indicate general game information including, for example, the number of coins played. The bill validator 30, player-input switches 32, video display monitor 34, and information panel are devices used to play a game on the game machine 2 including the wireless game player 725. The devices are controlled by a master gaming controller (see FIG. 6), housed inside the main cabinet 4 of the machine 2. Many possible games, including traditional mechanical slot games, video slot games, video poker, video pachinko, multiple hand poker games, video pai-gow poker, video black jack, video keno, video bingo, video roulette, video craps, video card games and general games of chance, may be provided with gaming machines of this invention. These games may be played using the wireless game player 725.

General games of chance refer to games where a player makes a wager on an outcome of the game. The outcome of the game of chance may be affected by one or more decisions may be the player. For instance, in a video card game, the player may hold or discard cards which affects the outcome of the game.

The top box 6 houses a number of devices, which may be used to add features to a game being played on the gaming machine 2, including speakers 10, 12, 14, a ticket printer 18 which may print bar-coded tickets 20, a key pad 22, a fluorescent display 16, a camera 45, microphone 44 and a card reader 24 for entering a magnetic striped cards. The speakers may be used to project sound effects as part of a game outcome presentation. The keypad 22, the fluorescent display 16 and the card reader 24 may be used for to enter and display player tracking information. As another example, the player may enter playing tracking information and identification information using the card reader 24 and the main video display 34 where the main video display may be used as a touch screen to enter information. Player tracking information may be entered into the gaming machine before a player initiates a game on the gaming machine. Typically, the player's incentive to enter player tracking information into the gaming machine 2 is potential rewards related to the amount of a player's game play.

The top box also includes a candle 46. The candle is a light that may be activated by the master gaming controller on the gaming machine. In one embodiment, an antenna (not shown) may be installed in the candle. The antenna may be used to provide wireless game play sessions to one or more wireless game players in communication with the gaming machine 2 via the antenna.

In addition to enabling player tracking services, the key pad 22, the fluorescent display 16 and the card reader 24 may be used to enter identification information that enables a player to access entertainment content or receive personal messages on the gaming machine independent of a game play and game outcome presentation on the gaming machine 2. For example, a player may enter a personal identification number into the gaming machine 2 using the key pad 22 that allows the player to receive entertainment content such as viewing a movie or a broadcast event. As another example, after entering the personal identification number, the player may be allowed to receive a personal message indicating a table is ready at a restaurant in the casino or to receive a personal message containing information on a sporting event such as a score of personal interest to the player utilizing the gaming machine.

In one embodiment of the present invention, the player tracking services and related gaming service described above may be provided via a touch screen interface on the wireless game player 725. For instance, the wireless game player 725 may include a card reader for reading a player tracking card and player tracking identification information may be provided via a touch screen interface on the wireless game player. Further, the player may be able to access player tracking information using the wireless game player 725.

In addition to the devices described above, the top box 6 may contain different or additional devices than shown in the FIG. 5. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2. Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video, while others are designed for bar tables and have displays that face upwards. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 5, when a user selects a gaming machine 2, he or she inserts cash through the coin acceptor 28 or bill validator 30. Additionally, the bill validator may accept a printed ticket voucher which may be accepted by the bill validator 30 as an indicia of credit. Once cash has been accepted by the gaming machine, it may be used to play a game on the gaming machine. Typically, the player may use all or part of the cash entered into the gaming machine to make a wager on a game play. Depending on the amount of the wager on a game or for a fee, a player may be able to access various entertainment content sources for a length of time. For example, a wager on a game above a certain threshold amount may enable a player to watch a broadcast event or to access the World Wide Web for up to 5 minutes after each wager on the gaming machine 2. In addition, cash or indicia of credit entered into the gaming machine may be used to purchase entertainment content independent of a wager made on a game on the gaming machine. For example, for a 10 dollar fee, a player may view a movie on the gaming machine. While watching the movie on the gaming machine, the player may play games on the gaming machine 2 or the wireless game player 725 or just watch the movie.

During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

When a game is not being played on the gaming machine or during particular game operational modes, the player may select an entertainment content source using the above mentioned inputs where the entertainment content is independent of a game being played on the gaming machine. The entertainment content source may include, for instance, a CD player, an FM/AM tuner, a VHS player, a DVD player, a TV tuner, a musical jukebox, a video jukebox, a computer, a server and a media software application. It will be appreciated, however, that any information source may be utilized. Entertainment content from these sources may be selected and displayed on the wireless game player 725. For instance, a player may listen to music from the FM/AM tuner via headphones connected to the wireless game player.

Before playing a game, a player may select the video jukebox, which may contain a DVD player loaded with many DVDs, as the entertainment content source and preview a movie on at least one of the display screens on the gaming machine 2. The DVDs may be stored on the gaming machine 2 or in a central location separate from the gaming machine. The visual display of the output from the video jukebox may be viewed by the player on the main video display screen 34, the secondary video display screen 42 or the remote display 728. The sound for the movie may be projected by the speakers 10, 12 and 14 on the gaming machine or a player may listen to the movie through headphones. As described above, the wireless game player 725 may include an interface for audio output such as a headphone jack.

The game player may also use the player input switches 32, keypad 22, and other input devices to control a feature of the entertainment content. For example, when the entertainment content is a movie, the player input switches 32 and keypad may be operated to fast forward, stop or pause the movie. When the entertainment content is accessing the World Wide Web through a web-browser, the player input switches 32 and keypad may be used to operate the web-browser. Input switches, as described with respect to FIG. 4, on the wireless game player 725 may also be used to control these functions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, throbbing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. When a player is using the wireless game player 725, credits available during the wireless game play session are stored on the gaming machine. To redeem credits, for instance to receive a printed ticket voucher, the player may have to return to the gaming machine 700 or a printing station supporting communications with the wireless game player 725. In some embodiments of the present invention, a player may be able to electronically transfer credits to a remote account accessible by the player.

FIG. 6 is a block diagram of the internal components of a gaming machine 2 and a wireless game player 725. Components that appear in FIGS. 4 and 5 are identified by common reference numerals. A master gaming controller 924 controls the operation of the various gaming devices and the game presentation on the gaming machine 2. In the present invention, the wireless game player 725 is one of the gaming devices the master gaming controller 924 controls. The master gaming controller 924 may communicate with the wireless game player 725 via a wireless communication link 952. The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

As described above, in the present invention, the gaming machine may operate in a local operational mode where a game is presented on a local display screen, such as display 34 and/or display 42 of gaming machine 2, a remote operational mode where a game is presented on the wireless game player 725 or combinations thereof. When the gaming machine 2 is in a local operational mode, using a game code and graphic libraries stored on the gaming machine 2, the master gaming controller 924 generates a game presentation which is presented on the displays 34 and 42. The game presentation is typically a sequence of frames updated at a rate of 60 Hz (60 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 936 located on the master gaming controller 924 or alternatively on the video controller 937. The gaming machine 2 may also include a video card (not shown) with a separate memory and processor for performing graphic functions on the gaming machine. Typically, the video memory 936 includes 1 or more frame buffers that store frame data that is sent by the video controller 937 to the display 34 or the display 42. The frame buffer is in video memory directly addressable by the video controller. The video memory and video controller may be incorporated into a video card which is connected to the processor board containing the master gaming controller 924. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 924, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 937 to one or more of the displays. For instance, a frame corresponding to a movie stored on the game partition 928 of the hard drive 922, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

When the gaming machine is in a remote operational mode and a game is presented on a display 726 of the mobile wireless game player 725, video frame data may be directly streamed from gaming machine 2 via the wireless interface 948 and wireless access point 950 to the wireless game player 725 via wireless interface 960. The video frame data may be stored in a memory 958 on the wireless game player 958 and then displayed on the display 725. The video frames sent to the wireless game player may be reduced in resolution and compressed to reduce the communication band-width necessary to transmit the video frames to the wireless game player 725.

In another embodiment, the video frames to present a game of chance may be rendered locally on the wireless game player 725. Graphical programs that allow a game to be rendered on the wireless game player may be stored in memory 958. For instance, the memory 958 may store a graphical program to render a slot game or a graphical program to render a card game. The memory 958 may store graphical programs for one or more games. For instance, the memory 958 may store graphical routines for a plurality of games supported by gaming machine 2. In one embodiment, the wireless game player 725 may be configured to allow different graphical programs for presenting different games to be downloaded into memory 958.

In other embodiments, the wireless gaming device may include a detachable memory and interface for the detachable memory. The detachable memory may store graphical applications for one or more games. Thus, to enable a particular game, a detachable memory storing graphical applications for the particular game may be inserted in the detachable memory interface on the wireless game player 725. The detachable memory may be in the form of read-only cartridges and may include a locking mechanism that prevents removal of the cartridge by the player. Thus, only authorized gaming personnel may be able to change a cartridge in the wireless game player.

The wireless game player may include a video card (not shown) to aid in the rendering process. The video card may include one or more graphical processing units that are used to render images to the display 726. The video card may be used to render 2-D graphics and 3-D graphics on the wireless game player 725. Graphical processing may also be performed by microprocessor 954 including 2-D and 3-D graphical rendering. Some images may be pre-rendered and stored on the wireless game player 725 and activated by a small string of commands from the gaming machine 2. Animations, such as reel rotation for a slot game, may be performed by routines on the wireless game player 725.

When the game graphics are rendered locally on the wireless game player 725, all of the game logic necessary to present the game of chance still resides on the gaming machine 2. Any switch or touch input necessary for game play on the wireless game player 725 (e.g., making a wager, initiating a game, holding cards, drawing cards, etc.) is transmitted 2 from the wireless game player 725 to the gaming machine 2. The gaming machine 2 executes gaming logic associated with the switch or touch inputs and sends the result back to the wireless game player 725. The wireless game player 725 verifies information sent from the gaming machine. In general, communication between the gaming machine 2 and the wireless game player 725 is encrypted. For any screen image or input involving the outcome of the game or betting, an additional level of transmit and receive data verification may be used by the wireless game player 725 and the gaming machine 2 to ensure the correct information is displayed on the wireless game player 725.

For illustrative purposes only, a series of commands between the gaming machine 2 and the wireless game player is described. The present invention is not limited to the commands described in this example. In response to input from player inputs 956 located on the wireless game player 725, the master gaming controller 924 may send a series of instructions to the wireless game player 725 that allow the game of chance to be rendered on display 726 of the wireless game player 725. The master gaming controller may also send instructions controlling audio output and other gaming devices on the wireless game player 725. For instance, for a slot game, the master gaming controller 924 may calculate symbol position, reel position, start and stop rotation for a number of reels. Then, the master gaming controller 925 may send one or more messages via the wireless communication link 952 to the wireless game player 725 with instructions such as 1) "render reels spinning", 2) "render reel 1 at position A", 3) "render reel 2 at position B", 4) "render reel 3 at position C", 5) "output audio B", 6) "display light pattern A," etc. The instructions may be processed and implemented by the microprocessor 954 using graphical software stored on the wireless game player 725.

In one embodiment, the wireless game player may be connected to a number of peripheral devices such as a printer 970 or a card reader 972. The printer 970 and the card reader 972 may communication with the wireless game player via a wire communication protocol such as serial, parallel, USB, Firewire or IEEE 1394. The peripheral devices, such as 970 and 972, may be controlled by the microprocessor 954 according to inputs received by the wireless game player and may also be controlled by the master gaming controller 924 on the gaming machine 2.

For gaming machines, an important function is the ability to store and re-display historical game play information. The game history provided by the game history information assists in settling disputes concerning the results of game play. A dispute may occur, for instance, when a player believes an award for a game outcome was not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. The game history information is used to reconcile the dispute.

During the game presentation, the master gaming controller 924 may select and capture certain frames to provide a game history. These decisions are made in accordance with particular game code executed by controller 924. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller. Details of frame capture for game history applications are provided in U.S. Pat. No. 6,863,608, which is incorporated herein in its entirety and for all purposes.

In general, the gaming machine 2 maintains transaction logs of all events and game play. In some embodiments, as described above, the gaming machine may generate and store video frames as a game history record. The video frames may correspond to gaming information displayed on the wireless game player 725. During a wireless game play session, when the wireless game player 725 stops responding to the gaming machine 2, the game presented on the wireless game player 725 stops. The wireless game player 725 may stop responding to the gaming machine 2 because the wireless game player 725 is out-of-area reception, a battery level is low on the wireless game player, a power failure on the gaming machine 2 and other factors. To continue an interrupted game, the wireless game player 725 may ping the gaming machine 2 to reestablish communications and start the verification and authentication cycle as previously described. In the case of a dispute, the player may have to return to the gaming machine 2 so that game history records on the gaming machine can be accessed.

Figure 7:
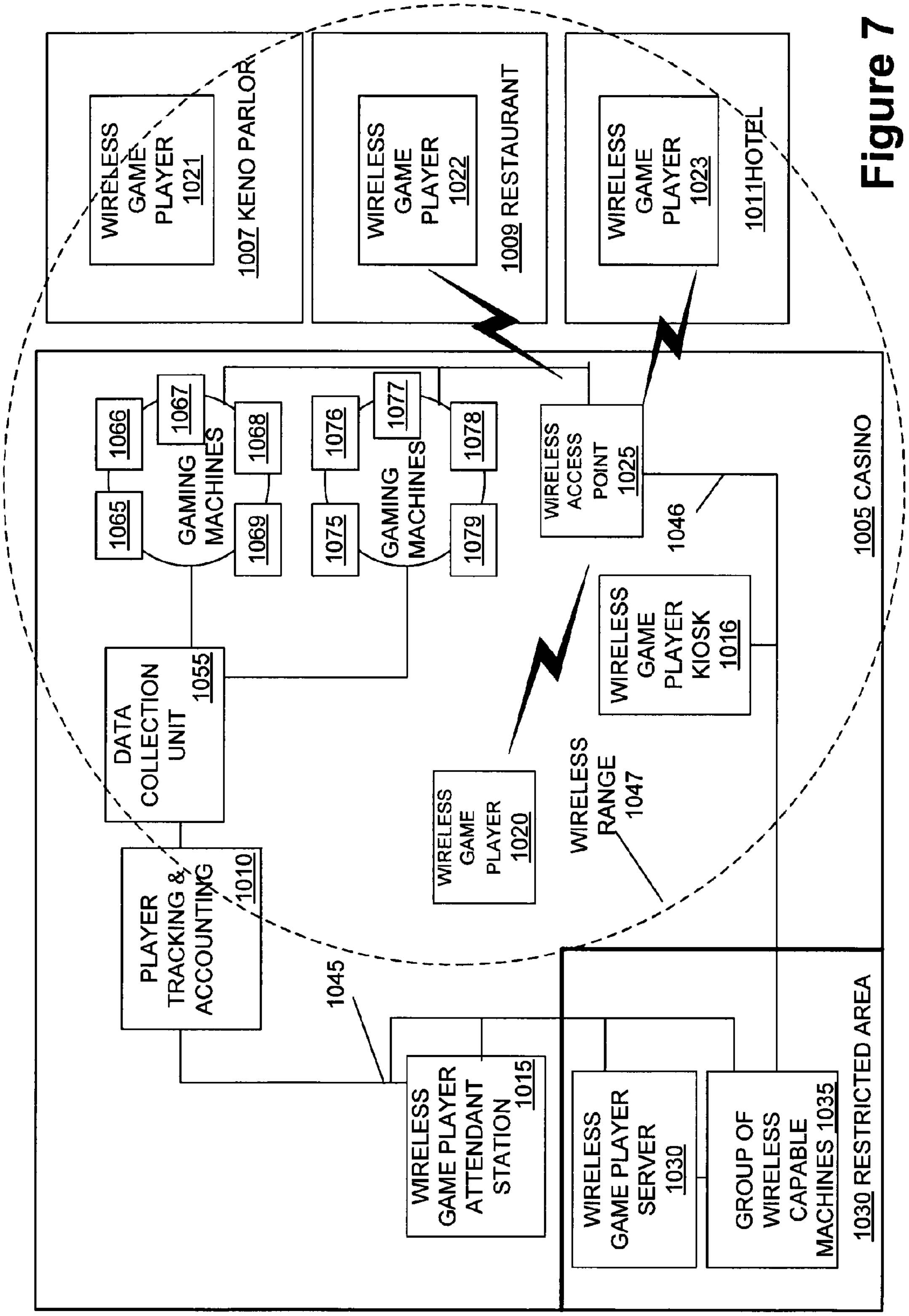
FIG. 7 is a block diagram of a network of gaming machines and wireless game players.

FIG. 7 is a block diagram of a network of gaming machines and wireless game players. Gaming machines 1065, 1066, 1067, 1068, 1069, 1075, 1076, 1077, 1078 and 1079, located in a floor area of casino 1005, support wireless game play and are connected to a wireless access point 1025. The gaming machines 1065, 1066, 1067, 1068, 1069, 1075, 1076, 1077, 1078 and 1079 are also connected to a player tracking system 1010 via a data collection unit 1055. Thus, game play on a wireless game player, such as 1020, in communication with one of the gaming machines on the casino floor may generate player tracking points. Further, a player using a game player, such as 1020, may be able to utilize services traditionally offered through player tracking devices on gaming machines such as a drink request. To provide the player tracking services, a player tracking service interface may be displayed on the touch screen of the wireless game player. Details of player tracking services and other gaming services that may be provided through a wireless game player of the present invention are described in U.S. Pat. No. 6,908,387, which is incorporated herein in its entirety and for all purposes.

The gaming machines located on the casino floor may also be connected to other remote servers such as but not limited to cashless system servers, progressive game servers, bonus game servers, prize servers, Internet, an entertainment content server, a concierge service server and a money transfer server and the like. Game services offered by the remote servers connected to the gaming machines may also be offered on wireless game players such as 1020. For instance, a game player may participate in a progressive game using the wireless game player 1020. In another example, a game player may be able to perform a cashless transaction enabled by a cashless system, such as the EZPAY™ cashless system (IGT, Reno Nev.), using a wireless game player.

In one embodiment, the gaming machines 1065, 1066, 1067, 1068, 1069, 1075, 1076, 1077, 1078 and 1079 connected to the access point 1025 are each provided with a wireless game player, such as 1020, 1021, 1022 and 1023. The gaming machines use a common wireless access point

1025. In this case, the access point device is also a multi-port switch. So, each machine has an Ethernet connection to the access point 1025.

In another embodiment of the present invention, an antenna may be built into a candle located on top of a gaming machine or some other location in the gaming machine. The antenna may be used as a wireless access point for wireless game play on one or more gaming machines. As an example, an antenna may be installed in the candle of gaming machine 1067 to be used as a wireless access point for wireless game play on gaming machines 1065, 1066, 1067, 1068 and 1069. A single gaming machine with an antenna may be used as part of a larger network of gaming devices providing wireless game play or may be used independently of a larger network. The antenna can, for example, be provided in accordance with the techniques described in the U.S. Pat. No. 5,605,506, entitled "CANDLE ANTENNA."

To obtain a wireless game player on one of the gaming machines on the casino floor, a player may request a wireless game player via a service call on the gaming machine such as through the player tracking system. The request may go to a remote location, such as a terminal at a wireless game player attendant station 1015 and an attendant may then bring a wireless game player to the gaming machine where the request for wireless game play has been made. The request may be routed to the attendant station 1015 via the wireless game player server 1030. When a wireless game player server 1030 is not used, the request may be sent directly to the attendant station 1015. As another example, when a request for wireless game play is made, a light on the gaming machine such as the candle on top of the gaming machine may be activated. In this case, a passing attendant may bring the game player a wireless game player. In yet another embodiment, a player may make a request for a wireless game player on a terminal at a wireless game player kiosk 1016.

Prior to enabling the network connection for the wireless game play, a person or a system program may determine the customer is eligible to use the wireless game player and verify their eligibility. For instance, most gaming jurisdictions include age eligibility rules which must be obeyed. As another example, eligibility to use a wireless game player may be based upon a player's value to a casino such as a status in a player tracking club. When authentication is required, the information is loaded from the system (could be a smart-card reader on the gaming machine) or a message appears on the gaming machine instructing the customer to provide information. For example, the gaming machines could have a fingerprint sensor located on the front panel or another biometric device. When required, the gaming machine could instruct the customer that it needs a fingerprint image or other biometric information before the customer may use the wireless game player. Information obtained through biometric sensors located on the gaming machine may be compared with information contained in a customer's biometric file. In some embodiments, the biometric information file may be downloaded to the gaming machine from a remote server and the biometric comparison may be performed on the gaming machine, the gaming machine may send biometric information to a remote server where the biometric comparison is performed, or combinations thereof.

In some instances, gaming machines supporting wireless game players may be located in a high-roller area (e.g., very valued customers) and the machines may have a specially designed stand where the wireless game players are stored. The wireless game players may be enabled by an attendant or may automatically be enabled when the casino customer inserts their player-tracking card into the gaming machine (special customer). As with the gaming machines located on the casino floor, the player-tracking system or some other remote gaming device may download the customer's biometric file to the gaming machine or the gaming machines could have a fingerprint sensor located on the front panel. When required, the gaming machine may instruct the customer that it needs a fingerprint image before the customer use the wireless game player.

To establish remote operations on the wireless game player, the gaming machine may ping the wireless game player with a series of communications. In one embodiment, once this operation is completed, the game play is transferred to the wireless game player. The screen of the gaming machines may go black (perhaps with an out-of-service message) and all customer cash and switch controls are locked out (nobody can use them). The master gaming controller on the gaming machine will continue to play the games, perform all the outcome determination and cash transaction (bets & credits), and maintains all the meter information. However, all the front panel and display data is channeled to the wireless game player. In one embodiment, when the gaming machines credit balance reaches zero, the customer is required to return to the gaming machine and insert more money. To enter more money, first, the local gaming machine controls are activated by the player or an attendant. In jurisdictions where the customer can use a debit or smart card to add money to a gaming machine, a card reader (smart card) connected to the wireless game player may be used to perform this function. In general, during a wireless game play session, the gaming machine communicates continuously with the wireless game player. In one embodiment, a web browser is used to display input switch commands. The displayed information on the wireless game player may come over from the gaming machine as HTML page information. Therefore, the wireless game player may use web-based transactions.

Additional details of a wireless game play network are described in the following paragraphs. The wireless game play network is shown in FIG. 7 is only one example of many possible embodiments of the present invention. The gaming machines and other gaming devices supporting wireless game play on wireless game players comprise a wireless game play network. The wireless game play network may be a part of a larger system network. The larger system network may provide the capability for a large number of gaming machines throughout a casino to be on the same wireless game play network. High-gain antennas and repeaters may be used to expand the range of the wireless game players allowing them to work in all areas of a casino/hotel complex, including hotels rooms and pool area. Racetracks, large bingo parlors and special outdoor events may also be covered within the wireless game play network allowing wireless game play in these areas.

The wireless game play network may also include wired access points that allow a wireless game player to be plugged directly into the network. For example, a wireless game player may include an Ethernet connector that may be directly plugged into the network segment 1046. The direct network connectors may be provided with cradles used to charge the wireless game player. The charging cradles may be located at many locations within the wireless game play network.

In FIG. 7, the range of the wireless access point 1025 is denoted by a circle 1047 used in the wireless game play network. Many such access points may be used in a wireless game play network depending upon the network topography. For instance, due the size of a particular casino and the area covered by a single access point, there could be other access points used as repeaters located throughout the casino and hotel. In addition, the wireless access point could also be connected to an existing network. After receiving an active wireless game player, a player may use the wireless game player in the areas of casino 1005 within the circle 1047. Further, the player may use the wireless game player, if approved by a local gaming jurisdiction, in the areas of a keno parlor 1007, a restaurant 1009, and a hotel 1011, which are within the circle 1047. While using the wireless game player, a player may wander to different locations within circle 1047 such as from the casino 1005 to the restaurant 1009.

In general, wireless game play in the wireless game play network is enabled by gaming devices executing licensed and regulated gaming software. However, the gaming devices supporting wireless game play are not limited gaming machines, such as 1065, 1066, 1067, 1068, 1069, 1075, 1076, 1077, 1078 and 1079 located on a casino floor. Special wireless-only gaming machines 1035 mounted in racks or containers connected to a wireless gaming network may be used to support wireless game play using wireless game players. The wireless-only gaming machines 1035 may not offer local game play. For instance, the wireless-only gaming machines 1035 may not include display screens. However, the wireless-only gaming machines are still regulated and licensed in a manner similar to traditional gaming machines. As another example, a wireless game player server 1030 with multiple processors may be used to support simultaneous game play on a plurality of wireless game players. The wireless-only gaming machines 1035 and the wireless game play server 1030 may be located in a restricted area 1030 of the casino 1005 and may not be generally accessible to game players.

The wireless-only gaming machines 1035 and wireless game play server 1030 are connected the wireless access point 1025 via a connection 1046. The wireless-only gaming machines 1035 and wireless game play server are also in communication with a wireless game player attendant station 1015 and the player tracking and accounting server 1010 via network connection 1045. The wireless-only gaming machine and wireless game player server 1030 may also be connected to other remote gaming devices such as a progressive servers, cashless system servers, bonus servers, prize servers and the like.

When using a wireless-only gaming machine, the customer may use a kiosk, such as 1016 or a cashier to enter cash and provide authentication information for a wireless game play session using a wireless game player. Then, the customer may be assigned a wireless game player, such as 1020, 1021, 1022 and 1023, in communication with one of the wireless-only gaming machines 1035 or the wireless game play server 1030. Once authenticated and verified, the customer may select a game and begin playing the wireless game player. There may be wireless game play cradles in the keno parlor 1022, restaurant 1009 or Sports Book areas, allowing the customer to play their favorite casino machine game and at the same time make keno or Sports Book bets or eat. In addition, the wireless game play cradles may be used to charge batteries on the wireless game player and may also be used to provide an additional network access point such as through a wire connection provided on the cradle. The wireless game player may also be used for Sports Book and Keno betting. Thus, a player may watch a horserace or see the results of a certain event on the display of the wireless game player.

Finally, the wireless game player may also be used for other activities besides gaming. For example, because of the authentication and verification (security) features, the wireless game player could be safe way to conduct monetary transactions such as electronic funds transfers. As another example, the wireless game player may be used for video teleconferencing to visually connect to a casino host or to provide instant messaging services. In addition, when the wireless game player supports web-based browsers and the wireless game play network includes Internet access, the wireless game player may be used to obtain any web-based services available over the Internet.

Figure 8:
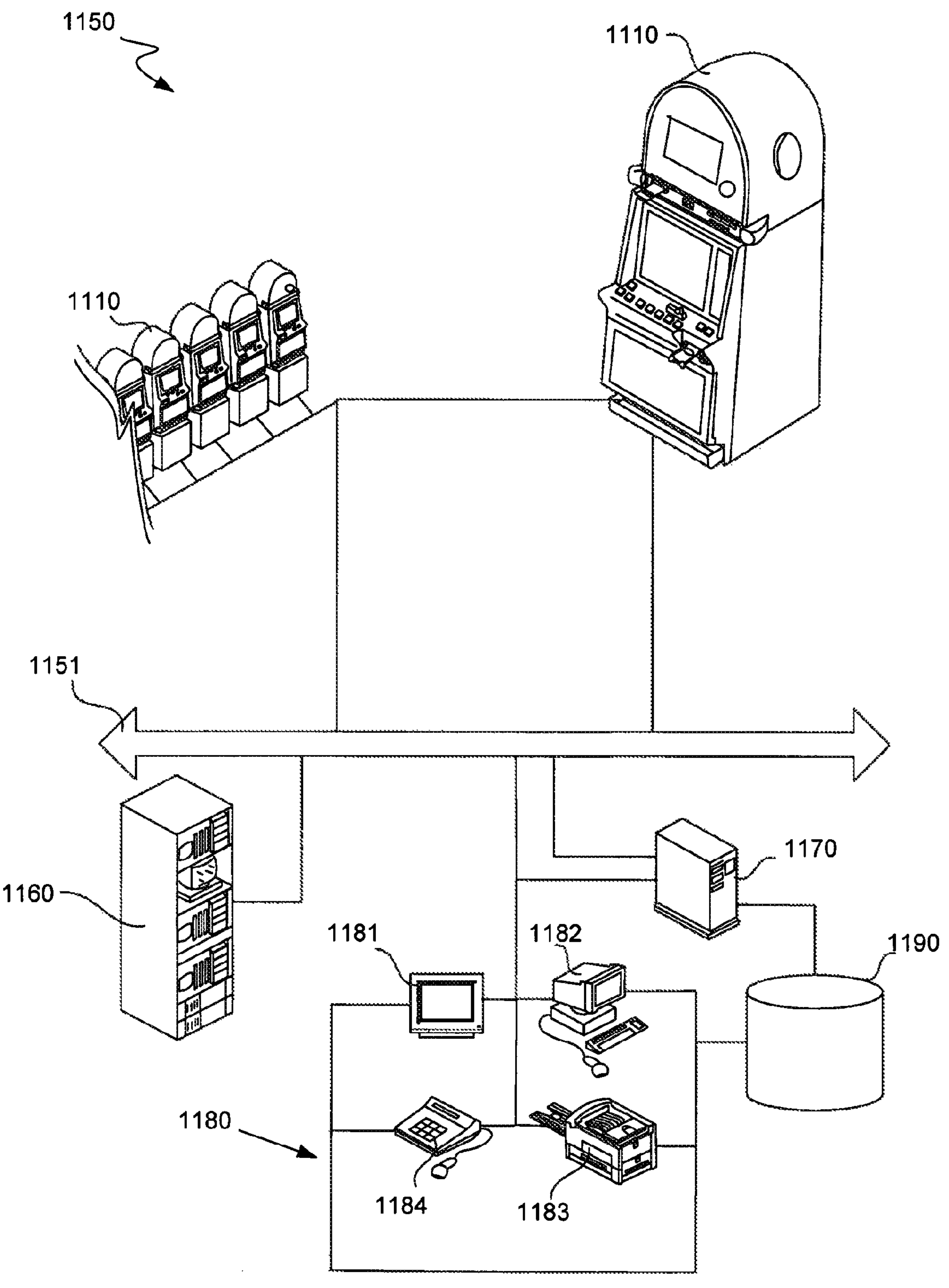
FIG. 8 depicts an example of network infrastructure for providing a gaming system having one or more gaming machines illustrated in block diagram format in accordance with one embodiment of the invention.

Referring now to FIG. 8, an exemplary network infrastructure for providing a gaming system having one or more gaming machines is illustrated in block diagram format. Exemplary gaming system 1150 has one or more gaming machines, various communication items, and a number of host-side components and devices adapted for use within a gaming environment. As shown, one or more gaming machines 1110 adapted for use in gaming system 1150 can be in a plurality of locations, such as in banks on a casino floor or standing alone at a smaller non-gaming establishment, as desired. Common bus 1151 can connect one or more gaming machines or devices to a number of networked devices on the gaming system 1150, such as, for example, a general-purpose server 1160, one or more special-purpose servers 1170, a sub-network of peripheral devices 1180, and/or a database 1190.

A general-purpose server 1160 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 1150 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 1150 can be isolated from any other network at the establishment, such that a general-purpose server 1160 is essentially impractical and unnecessary. Under either embodiment of an isolated or shared network, one or more of the special-purpose servers are preferably connected to sub-network 1180, which might be, for example, a cashier station or terminal. Peripheral devices in this sub-network may include, for example, one or more video displays 1181, one or more user terminals 1182, one or more printers 1183, and one or more other input devices 1184, such as a ticket validator or other security identifier, among others. Similarly, under either embodiment of an isolated or shared network, at least the specialized server 1170 or another similar component within a general-purpose server 1160 also preferably includes a connection to a database or other suitable storage medium 1190. Database 1190 is preferably adapted to store many or all files containing pertinent data or information regarding cashless instruments such as tickets, among other potential items. Files, data and other information on database 1190 can be stored for backup purposes, and are preferably accessible at one or more system locations, such as at a general-purpose server 1160, a special purpose server 1170 and/or a cashier station or other sub-network location 1180, as desired.

While gaming system 1150 can be a system that is specially designed and created new for use in a casino or gaming establishment, it is also possible that many items in this system can be taken or adopted from an existing gaming system. For example, gaming system 1150 could represent an existing cashless gaming system to which one or more of the inventive components or program modules are added. In addition to new hardware, new functionality via new software, modules, updates or otherwise can be provided to an existing database 1190, specialized server 1170 and/or general-purpose server 1160, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

We claim:

1. A gaming server comprising:

memory; and one or more processors configured to:

send one or more invitation indications to one or more devices associated with one or more entities, wherein said one or more invitation indications indicates that said one or more entities may be eligible to participate in a game managed by a gaming entity, wherein said sending includes sending said one or more invitation indications to one or more devices associated with one or more entities that are located outside a gaming domain and wherein said gaming domain defines a location of an operation of said gaming entity;

receive a response indication from a first device of said one or more devices in response to said one or more invitation indications, wherein said first device is associated with a first entity of said one or more entities, and wherein said response indication indicates that said first entity is willing to participate in said game managed by said gaming entity;

determine whether to allow said first entity to participate in said game after sending said one or more invitation indications to said first device, wherein the determination includes determining whether allowing said first entity to participate in said game would exceed a total number of entities located outside a said gaming domain of said gaming entity that are allowed to participate in said game;

allow said first entity to participate in said game when it is determined that said first entity can participate in said game; and send said first device an outcome indication indicative of an outcome of said game when said first entity is allowed to participate in said game.

2. The gaming server of claim 1, wherein said gaming server is operable and configured to communicate with a plurality of devices that are not owned or operated by said gaming entity.

3. The gaming server of claim 1, wherein the gaming server is further configured to send a game state indication regarding a game state prior to the outcome.

4. The gaming server of claim 1, wherein said game is provided as a bonus game, wherein said gaming entity is a casino that operates in at least one casino building, and wherein said one or more entities are not inside said at least one casino building.

5. The gaming server of claim 1, wherein said first device is configured to:

receive as input said one or more invitation indications that indicates that said first entity associated with said first device may be eligible to participate in a game managed by said gaming entity;

receive input indicative of said first entity's willingness to participate in said game;

send as output said response indication indicative of said first entity's willingness to participate in said game when said input indicative of said first entity's willingness to participate in said game is received;

allow said first entity to participate in said game managed by said gaming entity, wherein said first entity is allowed to participate after it is determined whether allowing said first entity to participate in said game would exceed a total number of entities located outside said gaming domain that are allowed to participate in said game; and receive said outcome indication indicative of an outcome of said game.

6. The gaming server of claim 1, wherein said one or more entities do not manage said game.

7. The gaming server of claim 1, wherein said one or more entities are at least one of a person, a group or an organization.

8. The gaming server of claim 1, wherein the gaming server sends one or more invitation indications to one or more entities located outside the gaming domain after detecting a triggering event.

9. The gaming server of claim 1, wherein said gaming domain is a physical location where said gaming entity operates a casino.

10. The gaming server of claim 1, wherein said gaming domain is a jurisdiction where said gaming entity operates.

11. The gaming server of claim 2, wherein said plurality of devices include at least one mobile device.

12. The gaming server of claim 5, wherein said first device is further operable and configured to:

execute a client application program operable to communicate with the gaming server which allows said entity to participate in said game.

13. The gaming server of claim 5, wherein said first device is further operable and configured to communicate with a user agent that allows said first entity to participate in said game.

14. The gaming server of claim 5, wherein said first device is further operable and configured to receive a game state indication regarding a game state prior to the outcome.

15. The gaming server of claim 13, wherein said user agent includes a browser operable for browsing a web site of said gaming entity.

16. The gaming server of claim 8, wherein the triggering event is at least one of: a time event, a winning event at a gaming machine or a max bet at a gaming machine.

17. A method of managing a game by a gaming entity for participation by one or more entities, said method comprising:

sending one or more invitation indications to one or more devices associated with said one or more entities, wherein said one or more invitation indications indicates that said one or more entities may be eligible to participate in said game managed by said gaming entity, wherein said sending includes sending said one or more invitation indications to one or more devices associated with one or more entities that are physically located outside a gaming domain and wherein said gaming domain defines a location of an operation of said gaming entity;

receiving a response indication from a first device of said one or more devices in response to said one or more invitation indications, wherein said first device is associated with a first entity of said one or more entities, and wherein said response indication indicates that said first entity is willing to participate in said game managed by said gaming entity;

determining whether to allow said first entity to participate in said game after sending said one or more invitation indications to said first device, wherein said determination includes determining whether allowing said first entity to participate in said game would exceed a total number of entities physically located outside said gaming domain that are allowed to participate in said game;

allowing said first entity to participate in said game when it is determined that said first entity can participate in said game; and sending said first device an outcome indication indicating an outcome of said game when said first entity is allowed to participate in said game.

18. The method of claim 17, wherein said method further comprises: determining by said gaming entity said outcome of said game for said first entity when said first entity is allowed to participate in said game.

19. The method of claim 17, further comprising sending a game state indication regarding a game state prior to the outcome.

20. The method of claim 17, wherein said determining whether to allow said first entity to participate in said game comprises: determining whether said first entity remains eligible to participate in said game.

21. The method of claim 17, wherein said one or more invitation indications is initiated and sent to said first entity before receiving a request for participation in said game from said first entity.

22. The method of claim 17, wherein said first device is not owned or controlled by said gaming entity.

23. The method of claim 17, wherein said sending comprises sending said one or more invitation indications to a plurality of devices, and wherein said determining of whether to allow said first entity to participate in said game comprises one or more of the following:

determining whether said response indication has been received within a determined amount of time, determining whether allowing said first entity to participate in said game would exceed a determined total number of entities that are allowed to participate in said game; or determining whether allowing said first entity to participate in said game would exceed a determined number of devices in communication with said gaming entity.

24. The method of claim 20, wherein said determining whether to allow said first entity to participate in said game further comprises:

authenticating said first entity; and allowing said first entity to participate in said game only when said authenticating successfully authenticates said first entity.

25. The method of claim 21, wherein said one or more invitation indications is a limited invitation for participation in said game.

26. The method of claim 25, wherein said first entity is outside said gaming domain of said gaming entity.

27. The method of claim 22, wherein said method further comprises:

determining the physical location of said first device; and determining a first set of rules and regulations to apply based on the physical location of said first device.

28. The method of claim 23, wherein said method further comprises:

allowing said first entity and a second entity to both participate in said game.

29. The method of claim 28, wherein said first entity is outside a gaming domain of said gaming entity, but said second entity is within said gaming domain.

30. The method of claim 29, wherein said method further comprises:

determining whether to apply a first set of rules and/or regulations for said first entity that is different from a second set of rules and regulations applied to said second entity.

31. The method of claim 30, wherein said second entity is a second person playing said game as a wagering game in a casino, and wherein said first entity is a first person using said first device outside of said casino.

32. The method of claim 31, wherein said method further comprises: sending an invitation to said second person to participate in said wagering game.

33. The method of claim 32, wherein said method further comprises: allowing said first person to play against said second person.

34. The method of claim 33, wherein said method further comprises: inviting said second person to participate in playing a bonus game for said wagering game.

35. A non-transitory computer readable medium including executable computer program code for managing a game by a gaming entity for participation by one or more entities, wherein said executable computer program code comprises instructions to control at least one device to do the following:

sending one or more invitation indications to one or more devices associated with said one or more entities, wherein said one or more invitation indications indicates that said one or more entities may be eligible to participate in said game managed by said gaming entity, wherein said sending includes sending said one or more invitation indications to one or more devices associated with one or more entities that are located outside a gaming domain and wherein said gaming domain defines a location of an operation of said gaming entity;

receiving a response indication from a first device of said one or more devices in response to said one or more invitation indications, wherein said first device is associated with a first entity of said one or more entities, and wherein said response indication effectively indicates that said first entity is willing to participate in said game managed by said gaming entity;

determining whether to allow said first entity to participate in said game after sending said one or more invitation indications to said first device, wherein said determination includes determining whether allowing said first entity to participate in said game would exceed a total number of entities located outside said gaming domain of said gaming entity that are allowed to participate in said game;

allowing said first entity to participate in said game when it is determined that said first entity can participate in said game; and sending said first device an outcome indication indicative of an outcome of said game when it is determined that said first entity can participate in said game.

* * * * *

UNITED STATES PATENT AND TRADEMARK OFFICE

CERTIFICATE OF CORRECTION

PATENT NO. : 8,221,241 B2
APPLICATION NO. : 12/353134
DATED : July 17, 2012
INVENTOR(S) : Dwayne A. Davis et al.

It is certified that error appears in the above-identified patent and that said Letters Patent is hereby corrected as shown below:

At column 33, line 14, in Claim 1, delete “a” between “outside” and “said”;

At column 33, line 15, in Claim 1, delete “of said gaming entity”;

At column 36, line 42, in Claim 35, delete “of said gaming entity”.

Signed and Sealed this
Twenty-seventh Day of November, 2012

David J. Kappos
*Director of the United States Patent and Trademark Office*